United States Patent [19]

Morrison et al.

[11] Patent Number: 5,587,351

[45] Date of Patent: *Dec. 24, 1996

[54] THERMAL TRANSFER SYSTEMS HAVING VANADIUM OXIDE ANTISTATIC LAYERS

[75] Inventors: Eric D. Morrison, West St. Paul; Jeffrey C. Chang, North Oaks; Linda K. Williams, St. Paul, all of Minn.

[73] Assignee: Minnesota Mining and Manufacturing Company, St. Paul, Minn.

[ * ] Notice: The term of this patent shall not extend beyond the expiration date of Pat. No. 5,372,985.

[21] Appl. No.: 294,190

[22] Filed: Aug. 22, 1994

Related U.S. Application Data

[63] Continuation of Ser. No. 15,419, Feb. 9, 1993, abandoned.

[51] Int. Cl.$^6$ .............................. B41M 5/035; B41M 5/38
[52] U.S. Cl. .................... 503/227; 428/195; 428/484; 428/488.4; 428/704; 428/913; 428/914
[58] Field of Search ...................... 8/471; 428/195, 428/484, 488.1, 488.4, 704, 913, 914; 503/227

[56] References Cited

U.S. PATENT DOCUMENTS

| | | | |
|---|---|---|---|
| 4,203,769 | 5/1989 | Guestaux | 430/631 |
| 4,822,643 | 4/1989 | Chou et al. | 427/256 |
| 4,828,927 | 5/1989 | Timmerman et.al. | 428/480 |
| 4,839,224 | 6/1989 | Chou et al. | 428/323 |
| 4,847,237 | 7/1989 | Vanderzanden | 503/227 |
| 4,847,238 | 7/1989 | Jongewaard et al. | 503/227 |
| 4,853,365 | 8/1989 | Jongewaard et al. | 503/227 |
| 4,865,948 | 9/1989 | Masumoto et al. | 430/270 |
| 4,902,669 | 2/1990 | Matsuda et al. | 428/195 |
| 5,006,451 | 4/1991 | Anderson et al. | 430/527 |
| 5,008,178 | 4/1991 | Van Thillo et al. | 430/527 |
| 5,061,678 | 10/1991 | Jongewaard et al. | 503/227 |
| 5,141,915 | 8/1992 | Roenigk et al. | 503/227 |
| 5,214,024 | 5/1993 | Beck et al. | 503/227 |
| 5,306,691 | 4/1994 | Bauer et al. | 503/227 |
| 5,372,985 | 12/1994 | Chang et al. | 503/201 |
| 5,424,269 | 6/1995 | Chang et al. | 503/227 |

FOREIGN PATENT DOCUMENTS

| | | | |
|---|---|---|---|
| 0409526A3 | 7/1990 | European Pat. Off. | 503/227 |
| 444326A1 | 9/1991 | European Pat. Off. | 503/227 |
| 452568A1 | 10/1991 | European Pat. Off. | 503/227 |
| 60-151095 | 8/1985 | Japan | 428/195 |
| 5-119433 | 5/1993 | Japan . | |

OTHER PUBLICATIONS

F. Cartan et al., *J. Phys. Chem.*, 64, 1756–1758 (1960).
G. Defieuw et al., *Research Disclosure*, 155–159 (Feb. 1992).
G. Defieuw et al., *Research Disclosure*, 568–570 (Jul. 1992).
N. Gharbi et al., *Inorg. Chem.*, 21, 2758–2765 (1982).
S. Hioki et al., *Nippon Seramikkusu Kyokai Gakujutsu Ronbunshi*, 97, 628–633 (1989) (*Chem. Abs.*, 111, Abstract No. 119745x).
H. Hirashima et al., *Nippon Seramikkusu Kyokai Gakujutsu Ronbunshi*, 97, 235–238 (1989) (*Chem. Abs.*, 111, Abstract No. 62726k).
J. Livage, *Chem. Mater.*, 3, 578–593 (1991).
M. Nabavi et al., *Eur. J. Solid State Inorg. Chem.*, 28, 1173–1192 (1991).
W. Osterman, *Wiss. Ind. Hamburg*, 1, 17 (1922) (Abstract Only).
W. Pandtl et al., *Z. anorg. Chem.*, 82, 103 (Abstract Only).
C. Sanchez et al., *Mat. Res. Soc., Symp. Proc.*, 121, 93–104 (1988).
E. van Thillo et al., *Bull. Soc. Chim. Belg.* (European Section), 99, 981–989 (1990).
G. Wegelin, *Z. Chem. Ind. Kolloide*, 2, 25 (Abstract Only).

*Primary Examiner*—Bruce H. Hess
*Attorney, Agent, or Firm*—Gary L. Griswold; Walter N. Kirn; Susan Moeller Zerull

[57] ABSTRACT

A vanadium oxide coating useful as an antistatic protection layer on a donor sheet or a receptor sheet of a thermal transfer system is provided. The preferred antistatic coating is formed from a composition of a vanadium oxide colloidal dispersion.

16 Claims, 2 Drawing Sheets

THERMAL TRANSFER SYSTEMS HAVING VANADIUM OXIDE ANTISTATIC LAYERS

This is a continuation of application Ser. No. 08/015,419 filed Feb. 9, 1993, now abandoned.

FIELD OF THE INVENTION

The present invention concerns an antistatic coating useful as an antistatic protection layer on the donor and receptor sheets of thermal transfer systems. The preferred antistatic coating is formed from a composition of a vanadium oxide colloidal dispersion.

BACKGROUND OF THE INVENTION

Thermal transfer systems for thermal imaging utilize a recording method in which a donor sheet, having a colorant (i.e., dye or pigment) layer thereon, and a receptor sheet are brought into contact and heated in an imagewise manner, as with a thermal print head, laser, etc. The image-distributed heat source, such as a thermal print head, directly contacts the backside of the donor sheet. A thermal print head contains small electrically heated elements that can be selectively heated, thereby transferring colorant from the donor sheet to the receptor sheet and forming a desired image. This imaging process can involve either mass transfer of colorant in a binder or state-altered transformation of a dye, as by melting or sublimation of the colorant. In a mass transfer process, the colorant, e.g., dye or pigment, is dispersed within a binder and both the dye and its binder are transferred from a donor sheet to a receptor sheet. In a dye transfer process, the colorant (present on the donor with or without a binder) is transferred without binder by melting, melt-vaporization, propulsive ablation, sublimation, or vaporization to a receptor sheet where the colorant adheres to a receptor sheet or diffuses into an image-receiving layer.

Foreign substances, such as dust, can create areas of noncontact between the donor and receptor sheets or between the donor sheet and print heads, for example. Such noncontact areas adversely effect the transfer of an image. For example, a single particle of dust can easily get trapped under a print head and streak an image. This detrimental effect can occur whether the transfer occurs by mass transfer or dye transfer. Generally, foreign substances such as dust are attracted to the donor and/or receptor sheets as a result of electrostatic attraction to built-up electrical charges.

There is a growing interest in the use of antistatic materials and coatings to solve the problems created by the build-up of electric charges, i.e., "static electricity" in various fields of technology, such as the photographic, electronics, and magnetic recording industries. Antistatic materials, i.e., antistats, are electrically conductive materials that are capable of transporting charges away from areas where they are not desired. This conduction process results in the dissipation of the static electricity. In certain situations this results in a decrease in the build-up of dust.

A typical antistatic layer comprises an organic or inorganic conductive material in a binder. The layer dissipates electrical charges by the conduction of charged particles, which can be either ions or electrons. Ionically conductive antistatic coatings are thought to act as electrolytic solutions through which ions are transported under the influence of an electric field. They are typically salts or hydrophilic chemicals that are applied to the surface of an article. As such, they threaten contamination and/or corrosion of material, e.g., electronic components, and may interfere with the function of materials with which they come in contact. Furthermore, being hydrophilic or water soluble, they lack permanence when in contact with water. The use of ionically conductive coatings is especially difficult in applications in which the surface coatings must be in contact with air. For example, low friction layers, dye donor layers, and dye receptor layers must typically not be overcoated by materials that interfere with their function. Also, the function of ionically conductive antistatic coatings is dependent upon humidity. At low humidity, the coating is not sufficiently conductive to provide rapid dissipation of triboelectrically generated charges, i.e., charges resulting from friction-causing events such as unwinding and handling. Furthermore, at high humidity the coating can become soft, sticky, and can undergo a large volume change.

Preferable antistats for many applications are those that conduct electrons by a quantum mechanical mechanism rather than by an ionic mechanism. This is because antistats that conduct electrons by a quantum mechanical mechanism are generally effective independent of humidity. They are suitable for use under conditions of low relative humidity, without losing effectiveness, and under conditions of high relative humidity, without becoming sticky. Furthermore, such electronically conductive antistatic coatings remain effective when overcoated by, for example, a dye donor layer or dye receptor layer. A major problem, however, with such electron-conducting antistats is that they generally cannot be provided as thin, transparent, lightly colored or relatively colorless coatings by solution coating methods.

Metal particle, metal oxide particle, or carbon black dispersions can be used to provide electronically conductive coatings via solution deposition methods; however, such coatings tend to be darkly colored and opaque. This is generally not desirable for use in thermal transfer systems. Although there have been many attempts to do so, such as by using defect semiconductor oxide particle dispersions and conductive polymers, there has been very little success in depositing thin, transparent, lightly colored or relatively colorless electronically conductive antistatic coatings.

SUMMARY OF THE INVENTION

The present invention describes vanadium oxide coatings that can be used in thermal transfer systems to advantage. That is, vanadium oxide coatings can be used to provide antistatic characteristics to a donor and/or a receptor sheet in a thermal transfer system, preferably a thermal dye transfer system.

The vanadium oxide antistatic coating can be used on either side of a receptor sheet, i.e., film. That is, it can be either coated on a frontside of a receptor substrate under an image-receiving layer, or it can be coated on a backside of the substrate. Similarly, in a donor sheet, the vanadium oxide antistatic layer can be coated on a substrate either on its frontside, i.e., the side on which a colorant layer is coated, or on its backside. If the vanadium oxide layer is on the frontside of the donor sheet, it is preferably positioned between the substrate and the colorant layer. If it is on the backside of the donor sheet, and an optional antistick layer is also present on the backside, the vanadium oxide layer is preferably positioned between the substrate and the antistick layer.

Preferred vanadium oxide sols, i.e., colloidal dispersions, used in the deposition of the vanadium oxide layers of the present invention are prepared by hydrolyzing vanadium oxoalkoxides with an excess of water, preferably deionized water. Herein, "vanadium oxoalkoxides" refer to vanadium complexes with an oxide (=O) ligand and at least one alkoxide (—OR) ligand per vanadium atom. It is to be understood, however, that complexes referred to herein as vanadium oxoalkoxides can also include ligands other than the oxide and alkoxide groups.

Preferably, the vanadium oxoalkoxide is a trialkoxide of the formula $VO(OR)_3$, wherein each R is substituted or unsubstituted and is independently selected from a group consisting of aliphatic, aryl, heterocyclic, and arylalkyl groups. Herein, "substituted" R groups, i.e, substituted organic groups, mean that one or more hydrogen atoms are replaced by a functional group that is nonreactive to hydrolysis, and noninterfering with the formation of colloidal dispersions. Preferably, such functional groups include halide, hydroxide, thiol, and carbonyl groups, or mixtures thereof.

Each R is preferably independently selected from the group consisting of $C_{1-10}$ alkyl, $C_{1-10}$ alkenyl, $C_{1-10}$ alkynyl, $C_{1-18}$ aryl, and $C_{1-18}$ arylalkyl groups. These groups can also be substituted, or they can be unsubstituted, i.e., contain only hydrogen atoms. If substituted, they are preferably substituted with a functional group such as a halide, hydroxide, thiol, carbonyl, or mixtures thereof. More preferably, each R is independently selected from a group consisting of unsubstituted $C_{1-6}$ alkyl groups. When it is said that each R is "independently" selected from a group, it is meant that not all R groups in the formula $VO(OR)_3$ are required to be the same.

In the context of the present invention, the term "aliphatic" means a saturated or unsaturated linear, branched, or cyclic hydrocarbon group. This term is used to encompass alkyls, alkenyls such as vinyl groups, and alkynyls, for example. The term "alkyl" means a saturated linear or branched hydrocarbon group. The term "alkenyl" means a linear or branched hydrocarbon group containing at least one carbon-carbon double bond. The term "alkynyl" means a linear or branched hydrocarbon group containing at least one carbon-carbon triple bond. The term "heterocyclic" means a mono- or polynuclear cyclic group containing carbons and one or more heteroatoms such as nitrogen, oxygen, or sulfur or a combination thereof in the ring or rings, such as furan, thymine, hydantoin, and thiophene. It is preferred that any nitrogen atoms in the heterocyclic group be no more than weakly basic. The term "aryl" means a mono- or polynuclear aromatic hydrocarbon group. The term "arylalkyl" means a linear, branched, or cyclic alkyl hydrocarbon group having a mono- or polynuclear aromatic hydrocarbon or heterocyclic substituent. The aliphatic, aryl, heterocyclic, and arylalkyl groups can be unsubstituted, or they can be substituted with various substituents such as Br, Cl, F, I, OH groups, and the like.

Herein, "vanadium oxide" colloidal dispersions refer to colloidal dispersions of mixed valence vanadium oxide, wherein the formal oxidation states of the vanadium ions are typically +4 and +5. In this field, such species are often referred to as $V_2O_5$. Herein, the terms "sol," "colloidal dispersion," and "colloidal solution" are used interchangeably. They all refer to a uniform suspension of finely divided particles in a continuous liquid medium. The average particle size in a sol or colloidal dispersion is usually between about $5.0 \times 10^{-4}$ μm and about $5.0 \times 10^{-1}$ μm.

The vanadium oxide colloidal dispersions of the present invention contain at least a minimum effective amount of vanadium and preferably no greater than about 3.5 weight-percent (wt-%) vanadium. Preferably they contain about 0.3 wt-% vanadium to about 2.0 wt-% vanadium. Herein, these weight percentages are calculated from the amount of vanadium in the vanadium oxoalkoxide starting material, and are based on the total weight of the dispersion. In preferred embodiments, the ratio of $V^{4+}$ ions to the total concentration of vanadium ions, i.e., $V^{4+}+V^{5+}$ ions, is at least about 0.01:1.0, preferably at least about 0.05:1.0, and more preferably at least about 0.30:1.0.

The antistatic material useful in the present invention is a dispersed form of vanadium oxide which is extremely effective for the preparation of antistatic coatings. Such antistatic coatings, i.e., layers, impart a reduced tendency to attract dust. Furthermore, the alkoxide hydrolysis methods of the present invention produce preferred vanadium oxide colloidal dispersions capable of forming effective and advantageous antistatic coatings with significantly less material than do known alkoxide hydrolysis methods. The use of the preferred coatings prepared from the alkoxide hydrolysis methods described herein, as well as the other vanadium oxide coatings of the prior art, on thermal transfer sheets has proven to be extremely effective in reducing static problems without interfering with the transferability or developability of the image.

DETAILED DESCRIPTION OF THE INVENTION

Figure 1:
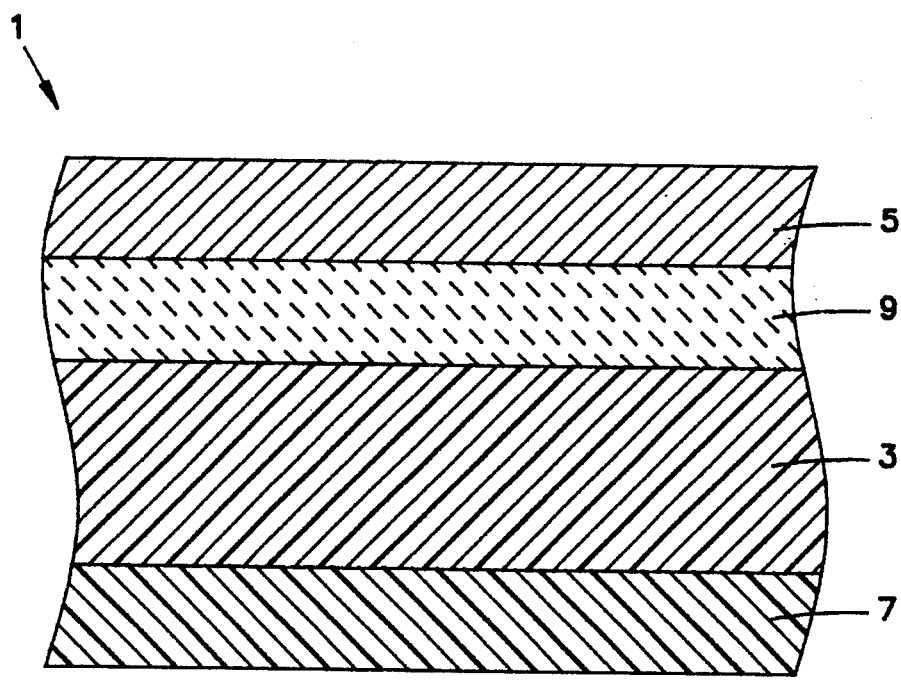
FIG. 1 is a schematic representation of a preferred donor sheet having a vanadium oxide antistatic layer coated on a substrate and beneath a colorant layer, with an antistick layer coated on the substrate backside.

Antistatic coatings of vanadium oxide are particularly beneficial and desirable in thermal transfer systems, either thermal mass transfer or thermal dye transfer systems, and preferably in thermal dye transfer systems. With this type of antistatic coating, the thermal transfer sheets remain static resistant during both imaging and processing. This helps to prevent dust-induced defects in the imaged sheets. Thus, the present invention provides a thermal transfer system containing at least one vanadium oxide antistatic layer.

In contrast to many traditional antistats, the vanadium oxide antistatic layers can be coated under layers in thermal transfer sheets, such as the image-receiving layer, and the dye donor layer, i.e., the donor colorant layer. This is because the vanadium oxide antistatic layers do not need humidity to be operative. Traditional antistats that function using an ionic mechanism usually need to be coated on the outermost surfaces of the donor and receptor sheets, or at least mixed with the material in the outermost layers. This can generally interfere with the imaging process in a thermal transfer process. Furthermore, even if an overcoat of an antistatic layer did not interfere with the function of, for example, the image-receiving layer and the donor colorant layer, such overcoated layers are typically difficult to obtain. That is, such layers as the donor colorant layer, for example, can be difficult to overcoat because they do not generally have easily wettable surfaces. It is to be understood, however, that the vanadium oxide antistat of the present invention can be coated on the outermost surfaces of thermal transfer sheets, or alternatively mixed with the material in the outermost layers, if the vanadium oxide does not substantially interfere with the imaging process.

Although the present invention discusses the use of vanadium oxide in thermal transfer donor and receptor sheets, an intermediate carrying sheet, which acts as both a receptor and a donor in certain thermal transfer systems, can also incorporate a vanadium oxide antistatic material. This is disclosed in U.S. Patent application Ser. No.08/015416, and entitled "Thermal Transfer Systems Having Delaminating Coatings," which is incorporated herein by reference. Thus, in a transfer system that involves use of an intermediate carrying sheet (often referred to as a retransfer system) the donor, final receptor, and any intermediate carrying sheet can advantageously incorporate vanadium oxide.

Thermal Transfer Systems

Thermal transfer printing systems are well known. They involve the use of a donor sheet, a receptor sheet, and a means for applying heat for transfer of an image from the donor sheet to the receptor sheet. The donor sheet consists of a substrate on which is coated a colorant, i.e., dye or pigment. The receptor sheet typically consists of a substrate on which is coated an image-receiving layer. In a mass transfer system, however, because of total transfer of meltable binder and colorant, the receptor film may not need an additional image-receiving layer. Both the donor and receptor sheets can include adhesive layers, i.e., primer layers, if desired. Either the donor sheet or the receptor sheet (or both) can include a vanadium oxide antistatic coating. In certain preferred embodiments, the vanadium oxide-containing antistatic coating eliminates the need for a primer layer, or priming treatment method. The thicknesses of the various layers are the same as those typically used in thermal transfer systems.

The substrate, i.e., support, for both the donor sheet and the receptor sheet is a flexible substrate that can be smooth or rough, transparent, translucent, or opaque, porous or nonporous. It can be formed from a film-forming material, such as paper, polymeric film, and the like. Most polymers used in the flexible substrate, however, are nonconductive and have inherent electrostatic problems. Thus, an antistatic layer is advantageous.

For most commercial purposes, the substrate is a polymeric resin such as a polyester (e.g., polyethylene terephthalate), polyolefin, polyvinyl resin (polyvinyl chloride, polyvinylidene chloride, etc.), polystyrene, polycarbonate, polyvinyl butyral, polyamide, polyimide, polyether sulfone, and cellulose ester. These support materials can be used as nontreated substrates, or antistick-coated substrates to prevent sticking by the thermal head. It is to be understood that colored substrates, reflective substrates, and laminated substrates can be used in the thermal transfer systems of the present invention.

Preferably, the substrate for a donor sheet is a film of polyester, especially polyethylene terephthalate, polyethylene naphthalate, or polysulfone. The substrate for a receptor preferably is transparent or white-filled polyethylene terephthalate or polyolefin, or opaque paper. The substrates for a donor sheet can be about 2–100 μm thick, but are typically about 3–8 μm thick to be able to feed through currently available printers. Preferably, the substrates for a donor sheet are less than about 8 μm thick to provide efficient heat conduction through the donor sheet construction. The substrates for a receptor sheet can be about 50–300 μm thick, but are typically about 70–250 μm thick to be able to feed through currently available printers.

Conventional thermal transfer donor sheets include a colorant layer coated on a substrate. Typically, this layer includes a colorant in combination with a binder, although a binder may not always be present. If present, the binder in a thermal mass transfer donor sheet is preferably a thermoplastic resin having a low glass transition temperature (Tg), i.e., generally less than about 100° C., or a low melting wax. These materials have a low enough melting or softening point that they are capable of transferring with the colorant to the receptor sheet. Examples of such binders include, but are not limited to, copolymers of vinyl chloride and vinyl acetate, butadiene and styrene copolymers, hydrocarbon waxes, epoxy resins, and chlorinated waxes. Examples of such thermal mass transfer donor sheets are disclosed in U.S. Pat. Nos. 4,839,224 and 4,847,237. The binder in a thermal dye donor sheet is a thermoplastic resin with a Tg of about 25°–180° C., and preferably about 50°–160° C. Useful binders are those that do not transfer themselves but allow the colorant to diffuse, sublime, vaporize, melt, or melt-vaporize, etc. out of the colorant layer thereby leaving the binder on the donor sheet. Examples of such binders include, but are not limited to, copolymers of vinyl chloride and vinyl acetate, polyester resins, polyacrylates, polycarbonates, cellulose, polyvinyl chloride (PVC), chlorinated PVC. Examples of such thermal dye transfer donor sheets are disclosed in U.S. Pat. No. 4,847,238.

The colorant can be a pigment, a stable dye, a polymeric dye, or any combination of these. It can be physically absorbed in the binder as when a dye is used. Alternatively, the colorant can be physically adsorbed to the binder as when a pigment is used, or chemically bound to the binder as occurs in a polymeric dye. Examples of colorant compositions are disclosed in U.S. Pat. Nos. 4,822,643; 5,061,678; 4,847,237; and 4,847,238. Preferably the colorant is a dye such as azo, indoaniline, anthraquinone, styryl, cyanine, mesocyanine, phenolic, ketomethylene, tricyanostyryl, diazine, and oxazine. Typically the molecular weight range is from about 100 to about 800.

The colorant layer can also include additives to help solubilize and stabilize the dye or pigment. These include polyurethanes, UV stabilizers, heat stabilizers, plasticizers, surfactants, silicones, low Tg polymers (Tg no greater than about 80° C.), elastomers, etc. The additives can be added in concentrations of about 0.1–20 wt-%, based on the total colorant concentration.

The donor sheet can also include an antistick layer, i.e., a layer of a heat-resistant material that prevents the donor sheet from sticking to the thermal print head. The antistick layer is coated on the backside of the substrate, i.e., the side of the substrate opposite the side on which the colorant is coated. This backside coating of an antistick material can include a silicone, polyurethane, higher fatty acid, fluorocarbon resin, etc. Examples of materials used in antistick layers are disclosed in U.S. Pat. No. 5,141,915.

The image-receiving layer on the receptor sheet is typically in direct contact with the donor colorant layer during thermal transfer imaging. It is designed to effectively receive an image from a donor sheet and to hold the image and yield a desired print with high optical image density, brightness, and stability. In a typical receptor sheet, the image-receiving layer can be bonded to the substrate through an intervening adhesive layer, or directly bonded to the substrate without such an adhesive layer. Furthermore, the image-receiving layer can have an optional barrier layer between it and the adhesive layer to prevent solvent migration or dye diffusion into the substrate. An example of such a barrier layer is gelatin.

The image-receiving layer generally consists of a polymeric resin that has a strong affinity toward colorants, i.e., dyes and pigments. This image-receiving layer, when contacted intimately with a donor sheet under heat and pressure, receives the colorant that is transferred from the donor. The polymeric resin can be thermoplastic, cross-linked, heat-cured, radiation-cured, etc. Preferably, it is a thermoplastic resin. Several classes of thermoplastic resins are known for use as an image receiver, including, but not limited to, polyesters, polyamides, polycarbonates, polyurethanes, polyvinylchlorides, polycaprolactones, poly(styrene-co-acrylonitriles), and mixtures thereof. Desired properties for effective image receptivity include inherent viscosity, molecular weight, glass transition temperature, compatibility, etc. Examples of thermal dye transfer receptor sheets are described in U.S. Pat. No. 4,853,365. In thermal dye transfer systems, the donor colorant layer and the image-receiving layer preferably contain the same binder resin for advantageous diffusion. Examples of thermal mass transfer receptor sheets are described in U.S. Pat. No. 4,853,365.

It is to be understood that the thermal dye transfer systems of the present invention can also include a lubricating layer coated over the image-receiving layer to improve separability of the donor sheet from the receptor sheet after image transfer. Lubricating layers permeable to colorants under normal conditions are well known. They are generally characterized by low surface energy and include silicone and fluorinated polymers. Examples include fluorinated polymers such as polytetrafluoroethylene, and vinylidene fluoride/vinylidene chloride copolymers, and the like, as well as dialkylsiloxane-based polymers.

Furthermore, the image-receiving layer can include other additives, such as UV stabilizers, heat stabilizers, antioxidants, plasticizers, surfactants, etc. It can also include a white pigment for improving the whiteness of the receptor sheet.

If desirable, the adherent properties of the flexible substrate with respect to the colorant layer, the image-receiving layer, etc., can be adjusted with the use of an adhesive layer, i.e., a primer layer, or a priming process. Advantageously, however, no primer or priming process is needed to improve the adherent properties of the substrate with the use of certain preferred vanadium oxide antistatic layers. For example, when an adhesive layer is needed to improve the adhesion of a particular colorant layer composition to a particular donor substrate material, the adhesive layer can generally be eliminated by the use a vanadium oxide antistatic layer containing an organic polymer, such as a sulfopolymer, as further discussed herein below.

In certain other embodiments, such as when vanadium oxide is used alone or with a polymer that is not readily adherent to a chosen substrate, a primer or priming process may be advantageous. For example, a priming process such as corona discharge, plasma treatment, laser ablation, quasiamorphization, and the like, can be used to alter the physical properties of the substrate and thereby improve its adhesive characteristics. Also, thermal adhesives, i.e., adhesives that soften at elevated temperatures, can be used to improve adhesion of the various layers in the donor sheet and the receptor sheet. Thermal adhesives, also known as hot melt adhesives, are well known in the art. They typically include a thermoplastic polymeric composition of a polyamide, polyacrylate, polyolefin, polystyrene, polyvinyl resin, and copolymers and blends of these polymers. If a thermal adhesive is used it preferably has a melting temperature of about 50°–100° C.

In a typical process for providing an image by a thermal transfer process, the colorant layer on the donor sheet is placed in contact with the image-receiving layer on the receptor sheet, i.e., the thermal transfer donor sheet and the thermal transfer receptor sheet are placed in a facing relationship. The donor sheet is selectively heated according to a pattern of information signals, i.e., in an imagewise distributed manner, whereby the material on the donor sheet, i.e., the dye or pigment (and in a mass transfer process, the binder as well), is transferred from the donor sheet to the receptor sheet. A pattern is formed thereon in a shape and density according to the intensity of heat applied to the donor sheet. The heating source can be an electrical resistive element, a laser, an infrared flash, a heated pen, or the like. The quality of the resulting image can be improved by readily adjusting the size of the heat source that is used to supply the heat energy, the contact place of the donor sheet and the receptor sheet, and the heat energy. The applied heat energy is controlled to give light and dark gradation of the image. Furthermore, in thermal dye transfer systems the applied heat energy is controlled for the efficient diffusion of the dye from the donor sheet to ensure effectively continuous gradation of the image as in a photograph.

The thermal transfer system of the present invention, wherein at least one of the donor and receptor sheets has a vanadium oxide antistatic coating thereon, can be used in the print preparation of a photograph by printing, facsimile, or magnetic recording systems wherein various printers of thermal printing systems are used. It can be used in the print preparation for a television picture, or cathode ray tube picture by operation of a computer, or a graphic pattern or fixed image for suitable means such as a video camera.

Vanadium Oxide Antistatic Layers

A thermal transfer system of the present invention can include a vanadium oxide layer on either the donor sheet, the receptor sheet, or it can be on both the donor sheet and the receptor sheet. The vanadium oxide layer not only provides antistatic characteristics, but in certain preferred configurations the vanadium oxide layer eliminates the need for an adhesive layer or priming process. For example, vanadium oxide mixed with an organic polymer, such as a sulfopolymer, can be both antistatic and priming. In some configurations, however, vanadium oxide alone may show improved adhesion. Generally, however, a vanadium oxide coating using the preferred vanadium oxide colloidal dispersions discussed below does not significantly degrade adhesion of the overcoated layer to the substrate.

In a thermal transfer donor sheet, the vanadium oxide layer can be coated on a substrate either on its frontside, i.e., the side on which the colorant layer is coated, or its backside. FIG. 1 is a schematic representation of a preferred donor sheet (1) having a substrate (3), a colorant layer (5), an antistick layer (7), and a vanadium oxide antistatic layer (9). The antistatic layer (9) is coated on the substrate (3), and positioned between the substrate (3) and the colorant layer (5). The antistick layer (7) is coated on the opposite side of the substrate (3), i.e., on the substrate backside.

Figure 2:
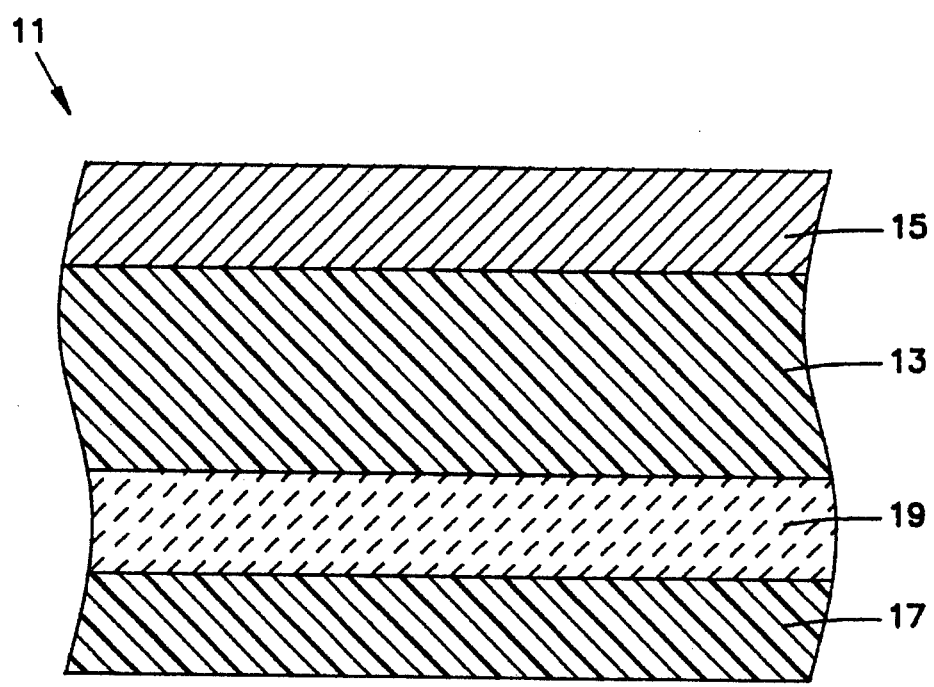
FIG. 2 is a schematic representation of an alternative embodiment of a donor sheet having a colorant layer coated on a substrate, with a vanadium oxide antistatic layer and an antistick layer coated on the substrate backside.

FIG. 2 is a schematic representation of an alternative embodiment of a donor sheet (11) having a substrate (13) on which is coated a colorant layer (15). On the opposite side of the substrate (13), i.e., the substrate backside, is coated an antistick layer (17) and a vanadium oxide antistatic layer (19). The antistatic layer (19) is positioned between the substrate (13) and the antistick layer (17).

The present invention provides a preferred process for the preparation of a thermal transfer donor sheet. This process involves: providing a thermal transfer donor substrate having a frontside and a backside, wherein the donor substrate is untreated and unprimed; coating a vanadium oxide colloidal dispersion onto the thermal transfer donor substrate frontside to form an antistatic layer; and coating a colorant directly on the vanadium oxide antistatic layer to form a thermal transfer donor sheet. Herein, the terms "untreated" and "unprimed" refer to a substrate that has not been heated to increase its adhesive characteristics.

Figure 3:
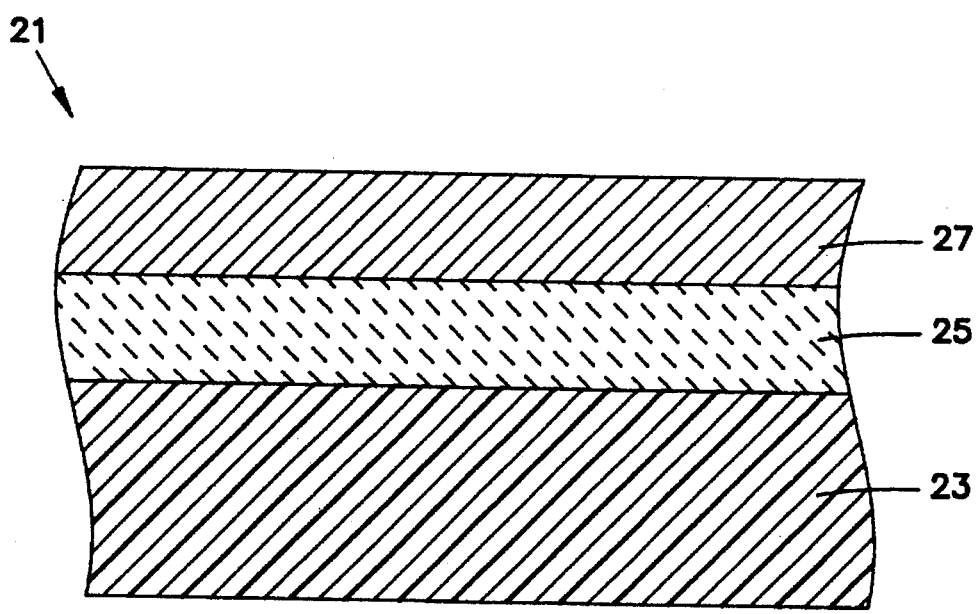
FIG. 3 is a schematic representation of a preferred receptor sheet having a vanadium oxide antistatic layer coated on a substrate and beneath an image-receiving layer.
Figure 4:
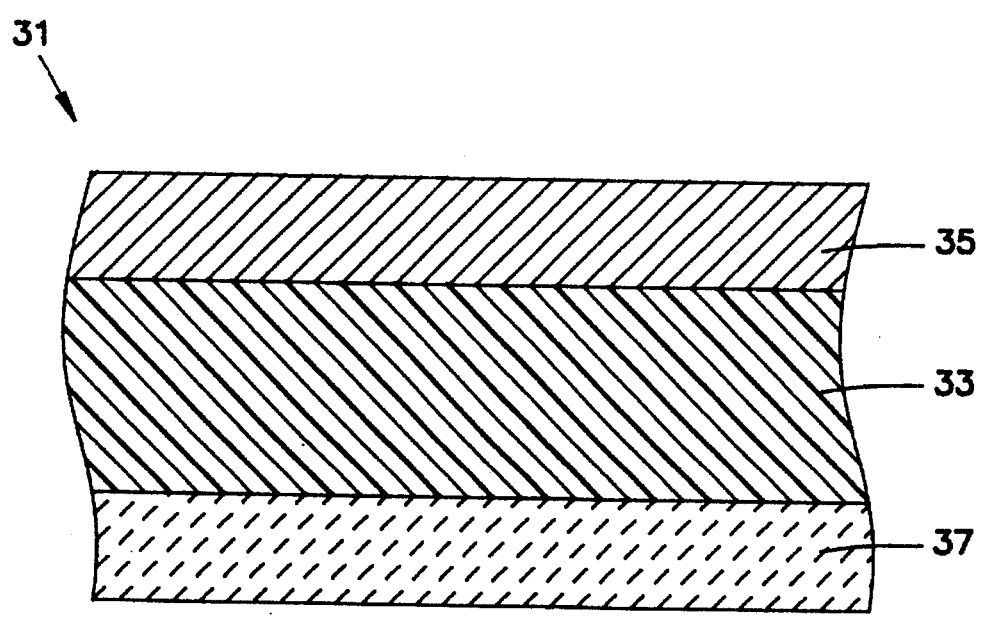
FIG. 4 is a schematic representation of an alternative embodiment of a receptor sheet having a substrate and an image-receiving layer coated thereon with a vanadium oxide antistatic layer coated on the substrate backside.

In a thermal transfer receptor sheet, the vanadium oxide layer can be coated on a substrate either on its frontside, i.e., the side on which an image-receiving layer is coated, or its backside. FIG. 3 is a schematic representation of a preferred receptor sheet (21) having a substrate (23) on which is coated a vanadium oxide antistatic layer (25). An image-receiving layer (27) is coated on the antistatic layer (25). FIG. 4 is a schematic representation of an alternative embodiment of a receptor sheet (31) having a substrate (33) and an image-receiving layer coated thereon (35) with a vanadium oxide antistatic layer (37) coated on the substrate backside.

If the vanadium oxide antistatic layer is coated on the backside of either the donor substrate or the receptor substrate, it is advantageous to overcoat it with a protective layer of material. This may be done, for example, by overcoating or encapsulating the vanadium oxide in a polymer binder. In this way, the antistatic layer is protected from physical and chemical damage. Overcoating can also be accomplished through the use of an antistick layer on the donor sheet, or through the use of a friction layer on the receptor sheet that facilitates feeding the receptor sheet through a printer.

Although FIGS. 1–4 show particularly preferred embodiments of donor and receptor sheets, the vanadium oxide can also be incorporated into the various layers. For example, vanadium oxide can be incorporated into an antistick layer, an image-receiving layer, or in some situations a donor colorant layer. In embodiments such as this, there is no distinct vanadium oxide layer separate from the other coating layers. That is, there is one layer incorporating both desired materials, e.g., an image-receiving material and vanadium oxide in an amount effective for electrostatic dissipation. It should be understood, however, that because of the fibrous structure of a vanadium oxide coating, the overcoated layer can penetrate the vanadium oxide layer. Thus, there may be no completely "distinct" and "separate" vanadium oxide layers in any embodiments of the present invention.

Preferably, for enhanced adhesion between the donor substrate and either the donor colorant layer or antistick layer, and between the receptor substrate and the image-receiving layer, it is advantageous to use as thin a coating of vanadium oxide as possible. Thus, a preferred vanadium oxide material is one that imparts effective antistatic properties at a relatively low coating weight. Alternatively, the vanadium oxide can be combined with a polymer, preferably a sulfonated polymer, for advantageous adhesion.

Significantly, effective antistatic coatings of vanadium oxide can be deposited in transparent, substantially colorless thin films by coating from aqueous dispersions. This is advantageous for many reasons, particularly from an ecological perspective. Thus, the process of the present invention for providing an image using a thermal transfer process decreases, and often substantially eliminates, problems associated with the use of organic solvents.

Vanadium oxide has three unique properties, i.e., its conduction mechanism, dispersibility, and morphology, which distinguish it from other antistatic coating materials. The latter two properties are generally highly dependent upon the method of synthesis, the first somewhat less so. The conduction mechanism in vanadium oxide is primarily a quantum mechanical mechanism known as small polaron hopping. By this mechanism, electrons are transported through the material by transference (i.e., by "hopping") from one vanadium (V) ion to the next. This conduction mechanism does not require the presence of a well-developed crystalline lattice or a specific defect structure, as do defect semiconductors such as doped tin oxide or doped indium oxide.

Because small polaron hopping electronic conduction does not require a well-developed crystalline structure there is no need for an annealing step when a film or coating is made from vanadium oxide. Furthermore, vanadium oxide is conductive simply upon precipitation or formation in solution, without being adversely affected by changes in relative humidity. Thus, a highly dispersed form of vanadium oxide that exhibits electronic conductivity, and desirable morphology, particle size, and dispersion properties is useful for the preparation of conductive antistatic coatings.

In the mid-1970's, Claude Guestaux of Eastman Kodak reported that a previously known synthetic method provides a vanadium oxide colloidal dispersion which, at the time, was considered uniquely useful for the preparation of antistatic coatings. Guestaux's method was based on a process originally described by Müller in 1911. The method is described in U.S. Pat. No. 4,203,769 and consists of pouring molten vanadium pentoxide into water. The product of this process, when appropriately aged, produces a good antistatic coating, which is useable in the present invention, although there are some drawbacks. These drawbacks include high energy requirements, the need for special reactor materials and equipment, and the creation of conditions which generate toxic vanadium oxide fumes. Furthermore, the Guestaux method results in incomplete dispersion of vanadium oxide. The nondispersed vanadium oxide must then be removed from the viscous dispersion; however, such viscous vanadium oxide dispersions are usually very difficult to filter. Also, in some situations, the vanadium oxide coatings prepared using this method may not exhibit good adhesive characteristics.

There are several other methods known for the preparation of vanadium oxide colloidal dispersions. These include inorganic methods such as ion exchange acidification of $NaVO_3$, thermohydrolysis of $VOCl_3$, and reaction of $V_2O_5$ with $H_2O_2$. Although vanadium oxide colloidal dispersions prepared by these methods are also useable in the present invention, they are less effective for the preparation of antistatic coatings than colloidal dispersions prepared by the process described by Guestaux in U.S. Pat. No. 4,203,769. To provide coatings with effective antistatic properties from dispersions prepared from inorganic precursors typically requires substantial surface concentrations of vanadium. Higher surface concentrations of vanadium generally result in the loss of desirable properties such as transparency, adhesion, and uniformity. Furthermore, vanadium oxide coatings prepared using this method may impart undesirable color.

One reaction known to yield particularly useful vanadium oxide colloidal dispersions useful as antistatic coatings in thermal transfer systems is the hydrolysis of vanadium alkoxides. This hydrolysis reaction typically gives preferred antistatic layer products that are not gels, discrete particles, or products similar to those obtained from other inorganic precursors of which applicants are aware. Instead, hydrolysis of vanadium oxoalkoxides under appropriate conditions gives vanadium oxide colloidal dispersions that are exceptionally useful precursors for antistatic coatings. Highly effective vanadium oxide colloidal dispersions prepared by these methods are characterized by: high aspect ratio colloidal particles, as observed in the final coating state by field emission scanning electron microscopy; and well-dispersed particles, i.e., not unacceptably agglomerated or flocculated particles. They may also be characterized by an effective concentration of vanadium(IV) ions, which are believed to be a source of mobile electrons in the quantum mechanical small polaron hopping mechanism. These and other aspects of this area of technology are disclosed in U.S. patent application Ser. No. 07/893,504, bearing Attorney's Docket No. 48138USA7A, and entitled "Vanadium Oxide Colloidal Dispersions and Antistatic Coatings," which is incorporated herein by reference.

The alkoxide-derived vanadium oxide colloidal dispersions preferred in the practice of the present invention are similar to those prepared by the process of U.S. Pat. No. 4,203,769 (Guestaux), if a further aging step is used subsequent to the Guestaux method. In the preferred alkoxide-derived dispersions the $V^{4+}$ concentrations are much higher than in the products prepared by the Guestaux method. In fact, $V^{4+}$ concentrations can, predictably and reproducibly, be made to vary over a surprisingly wide range, i.e., over a range of about 1–40% of total vanadium content in the colloidal dispersions of the present invention. Both dispersions are useful in the formation of the antistatic coatings of the present invention. The alkoxide process for the preparation of vanadium oxide colloidal dispersions offers advantages over the process of U.S. Pat. No. 4,203,769. This includes variable $V^{4+}$ concentrations, energy savings, convenience, elimination of conditions whereby highly toxic vanadium-containing fumes may be generated, absence of any need to filter the resultant colloidal dispersions, and ability to prepare the colloidal dispersion in situ (e.g., in organic polymer solutions).

The effectiveness of a dispersed form of vanadium oxide, i.e., a vanadium oxide colloidal dispersion, for the preparation of antistatic coatings can be expressed in terms of the surface concentration of vanadium. The surface concentration is described as the mass of vanadium per unit surface area, i.e., mg of vanadium per $m^2$ of substrate surface area, required to provide useful electrostatic charge decay rates. Generally, the lower the surface concentration of vanadium needed for effective conductivity in an antistatic coating, the more desirable the vanadium oxide colloidal dispersion. This is because with a lower surface concentration of vanadium, there is typically less color imparted to the coating, the coating is more transparent and uniform, and in some circumstances the coating generally adheres better to the substrate and may even provide better adhesion for subsequent layers.

Thus, preferred vanadium oxide sols for the preparation of antistatic coatings are those which exhibit the greatest effectiveness, that is, those which provide antistatic properties with the lowest possible surface concentrations of vanadium, i.e., the lowest coating weight of the vanadium oxide dispersion. High surface concentrations of vanadium may result in undesirable coloration, are more expensive, and may adversely affect adhesion of subsequently applied layers.

Preferred vanadium oxide antistatic coatings consist of a network of electrically conductive fibers on the surface of the substrate. Because of this open network, most of the surface of the substrate is uncovered, allowing for bonding of an image-receiving layer, for example, as if no antistatic layer were present between it and the receptor substrate. Although a vanadium oxide antistatic layer may exhibit priming properties itself, the open network and partial surface coverage of the antistatic layer allow insertion of the antistatic layer between a substrate and an image-receiving layer, antistick layer, and colorant layer, for example.

Preferred Vanadium Oxide Compositions

The preferred vanadium oxide products are produced by the hydrolysis of vanadium alkoxides. The products of this hydrolysis reaction typically include solutions of partially hydrolyzed vanadium alkoxide species, $V_2O_5$ gels, and $V_2O_5$ particulates. None of the products produced by this reaction, however, has been described as a vanadium oxide colloidal dispersion with properties similar to those of the dispersion prepared according to the process of U.S. Pat. No. 4,203,769 (Guestaux), particularly if an aging step is subsequently used. The products produced by the known hydrolysis methods require more relatively thick coatings for effective conduction. That is, using vanadium oxide colloidal dispersions produced from the hydrolysis of vanadium alkoxides according to known methods, the amount of vanadium oxide required in a coating, i.e., the surface concentration of vanadium, for effective antistatic properties is relatively high. Thus, using vanadium oxide colloidal dispersions produced by known alkoxide hydrolysis methods, there are problems with color formation, transparency, adhesion, and uniformity in the antistatic coatings; however, these problems are generally tolerable in thermal transfer systems.

A report by C. Sanchez et al. in *Mat. Res. Soc., Symp. Proc.*, 121, 93 (1988) discusses the hydrolysis of vanadium oxoalkoxides by an excess of water. Therein, it is stated that the chemical pathway leading to $V_2O_5$ solutions and gels from this hydrolysis method is similar to the pathway leading to $V_2O_5$ solutions from inorganic precursors such as $NaVO_3$ and $VOCl_3$. Sanchez et al. also state that the $V_2O_5 \cdot nH_2O$ gels so obtained have structural and physical properties close to that of vanadium pentoxide gels prepared by polymerization of decavanadic acid. Because sols and gels prepared from inorganic precursors, including decavanadic acid, generally do not form advantageous antistatic coatings, it has therefore been generally understood that vanadium oxide colloidal dispersions produced from the hydrolysis of vanadium oxoalkoxides do not form advantageous antistatic coatings. However, these materials are useful in thermal transfer systems, as are $V_2O_5$ materials made from inorganic precursors.

Preferred vanadium oxide colloidal dispersions used in the present invention are prepared by hydrolyzing vanadium oxoalkoxides with an excess of water, preferably deionized water. The vanadium oxoalkoxides can be any of a variety of compounds that can produce colloidal dispersions capable of forming, i.e., usable to produce, antistatic coatings with the properties desired as herein defined.

The preferred vanadium oxoalkoxides used in the present invention are vanadium complexes with one oxide ligand (=O) and at least one alkoxide ligand (—OR) per vanadium atom. They may also include ligands other than the oxide and alkoxide groups, such as carboxylates, sulfides, selenides, β-diketonates, halides, and pseudohalides such as —SCN⁻ and —CN⁻. The vanadium oxoalkoxides useful in the methods of the present invention can be monomeric, dimeric, or polymeric.

Preferably, the vanadium oxoalkoxides are of the formula $VO(OR)_3$, i.e., vanadium oxotrialkoxides, wherein each substituent R is substituted or unsubstituted and is independently selected from the group consisting of aliphatic, aryl, heterocyclic, and arylalkyl groups. Preferably each R is independently selected from the group consisting of $C_{1-10}$ alkyl, $C_{1-10}$ alkenyl, $C_{1-10}$ alkynyl, $C_{1-18}$ aryl, and $C_{1-18}$ arylalkyl groups. Each of these preferred alkoxide R groups may be substituted or unsubstituted. They may be substituted with halides, hydroxides, thiols, carbonyls, or mixtures thereof. More preferably each R group is independently selected from the group consisting of unsubstituted $C_{1-6}$ alkyl groups. Examples of usable vanadium oxotrialkoxides include, but are not limited to, $VO(OEt)_3$, $VO(O\text{-}i\text{-}Pr)_3$, $VO(O\text{-}n\text{-}Pr)_3$, $VO(O\text{-}i\text{-}Bu)_3$, $VO(O\text{-}n\text{-}Bu)_3$, $VO(O\text{-}t\text{-}Amyl)_3$, $VO(O\text{-}n\text{-}pentyl)_3$, and $VO(O\text{-}CH_2CMe_3)_{2.3}(O\text{-}i\text{-}Bu)_{0.7}$. It is understood that the hydrolysis process can involve hydrolyzing one or more vanadium oxoalkoxides, i.e., a mixture of oxoalkoxides.

The vanadium oxoalkoxides can also be prepared in situ, i.e., without isolation and/or purification of the vanadium oxoalkoxide prior to use, by combining from a vanadium oxide precursor species and an alcohol. For example, the vanadium oxoalkoxides can be generated by combining a vanadium oxide precursor species, such as, for example, a vanadium oxyhalide ($VOX_3$), preferably $VOCl_3$, or vanadium oxyacetate ($VO_2OAc$), with an appropriate alcohol such as i-BuOH, i-PrOH, n-PrOH, n-BuOH, t-BuOH, and the like. It is understood that if vanadium oxoalkoxides are generated from a vanadium oxide precursor species and an alcohol, they may contain ligands other than oxide and alkoxide ligands. For example, the product of the reaction of vanadium oxyacetate with an alcohol is a mixed alkoxide/acetate. Thus, herein the term "vanadium oxoalkoxide" is used to refer to species that have one oxide (=O) ligand and at least one alkoxide (—OR) ligand per vanadium atom, particularly if prepared in situ, i.e., without isolation and/or purification of the vanadium oxoalkoxide. Preferably, however, the vanadium oxoalkoxides are trialkoxides with one oxide and three alkoxide ligands.

The in situ preparations of the vanadium oxoalkoxides are preferably carried out under a nonoxidizing atmosphere such as nitrogen or argon. The vanadium oxide precursor species is typically added to an appropriate alcohol at room temperature. Preferably, it is added at a controlled rate such that the reaction mixture does not greatly exceed room temperature, if the reaction is exothermic. The temperature of the reaction mixture can be further controlled by placing the reaction flask in a constant temperature bath, such as an ice water bath. The reaction of the vanadium oxide precursor species and the alcohol can be done in the presence of an oxirane, such as propylene oxide, ethylene oxide, or epichlorohydrin, and the like. The oxirane is effective at removing by-products of the reaction of the vanadium oxide species with alcohols. If desired, volatile starting materials and reaction products can be removed through distillation or evaporative techniques, such as rotary evaporation. The resultant vanadium oxoalkoxide product, whether in the form of a solution or a solid residue after the use of distillation or evaporative techniques, can be combined directly with water to produce the vanadium oxide colloidal dispersions preferably used in the present invention.

The coatings may be made by combining a vanadium oxoalkoxide and an excess of water, preferably with stirring until a homogeneous colloidal dispersion forms. By an "excess" of water, it is meant that a sufficient amount of water is present relative to the amount of vanadium oxoalkoxide such that there is greater than 1 equivalent of water per equivalent of vanadium oxoalkoxide. That is, there is greater than a 1:1 molar ratio of water to vanadium-bound alkoxide ligands. Preferably, a sufficient amount of water is used such that the final colloidal dispersion formed contains no greater than about 3.5 wt-% vanadium and at least a minimum effective amount of vanadium. This typically requires a molar ratio of water to vanadium alkoxide of at least about 45:1, and preferably at least about 150:1. Herein, by "minimum effective amount" of vanadium it is meant that the colloidal dispersion contains an amount of vanadium in the form of vanadium oxide, whether diluted or not, which is sufficient to form an effective antistatic coating for the use desired.

For most uses, an effective antistatic coating has a surface concentration of vanadium, i.e., coating weight, ($[V]_{eff}$, calculated in mg of vanadium per $m^2$ of substrate surface area) of less than about 12 $mg/m^2$; however, for some end uses a value of $[V]_{eff}$ of less than about 20 $mg/m^2$ can be tolerated. For preferred uses, however, it is desirable that the antistatic coating have a $[V]_{eff}$ of less than about 6.0 $mg/m^2$, and more preferably less than about 3.0 $mg/m^2$, most preferably less than about 2.0 $mg/m^2$. Generally, the lower the surface concentration of vanadium required for effective conduction of electrostatic charges, the thinner the coating, which is advantageous and commercially desirable because thinner vanadium oxide coatings are generally less colored, more transparent, more uniform, and in certain circumstances possess better adhesion properties than do thicker coatings.

The value of $[V]_{eff}$ is the calculated surface concentration of vanadium required to provide an electrostatic charge decay time of less than 0.10 second for decay of a 5000 V potential to less than 50 V. The surface concentration of vanadium in antistatic coatings can be calculated from: (1) formulation data, assuming 100% conversion of the vanadium oxoalkoxide to the vanadium oxide colloidal dispersion, and also assuming the density of each successively diluted vanadium oxide colloidal dispersion is that of water (1.0 g/mL); and (2) the wet coating thickness (the wet coating thickness applied using a No. 3 Mayer Bar is 6.9 μm).

Colloidal dispersions with a vanadium concentration greater than about 3.5 wt-% are not generally desirable because they typically have poor dispersion properties, i.e., they are not dispersed well and are too gelatinous, and the coatings produced therefrom have poor antistatic properties. A coating with "poor" antistatic properties is one with a $[V]_{eff}$ value of greater than about 20 $mg/m^2$. Interestingly, colloidal dispersions originally prepared containing above about 3.5 wt-% vanadium do not typically exhibit improved properties if diluted to a colloidal dispersion containing a lesser amount of vanadium prior to formation of the coating. That is, the properties of a vanadium oxide colloidal dispersion containing above about 3.5 wt-% vanadium can not be easily improved upon dilution of the colloidal dispersion. It is possible, however, to improve the quality and stability of the colloidal dispersions containing above about 3.5 wt-% vanadium by adding an amine, such as, for example, N,N-diethylethanolamine. Although not intending to be limiting, it is believed that this increases the degree of ionization of colloidal particles by deprotonating V-OH groups.

In preparing preferred embodiments of the vanadium oxide colloidal dispersions, a sufficient amount of water is used such that the colloidal dispersion formed contains about 0.3 wt-% to about 2.0 wt-% vanadium. Most preferably, a sufficient amount of water is used so that the colloidal dispersion formed upon addition of the vanadium-containing species contains about 0.6 wt-% to about 1.7 wt-% vanadium.

Preferably, the water used in these methods is deionized water. By "deionized" water, it is meant that the water has had a significant amount of any $Ca^{2+}$, $Mg^{2+}$, and $Fe^{2+}$ ions originally present removed. Preferably, the deionized water contains less than about 50 parts per million (ppm) of these multivalent cations (total concentration of all multivalent cations), and more preferably less than about 5 ppm. Most preferably, the deionized water of the present invention contains less than about 50 ppm of a total cation concentration, including multivalent cations and monovalent cations, such as $Na^+$.

Multivalent cations cause the greatest detrimental effect to the quality of the dispersions of the present invention. That is, the dispersions are much more tolerant of monovalent cations, such as $Na^+$, than they are of multivalent cations, such as $Ca^{2+}$, $Mg^{2+}$, and $Fe^{2+}$. For example, the dispersions of the present invention can tolerate a total concentration of multivalent cations of up to about 50 ppm (parts per million), and a total concentration of monovalent cations of up to about 500 ppm, before flocculation occurs and the quality of the dispersion is significantly diminished.

As long as the water is deionized, there is no requirement that it be distilled. Thus, deionized tap water or well water can be used. Depending on the charge balance of the water, it can be neutral, slightly acidic, or slightly basic. The "deionized" water of the present invention can also be prepared using "softening" agents, such as $Na_2CO_3$, which replace the multivalent cations with $Na^+$. Thus, the term deionized water, as used herein, includes within its scope "soft" water, which contains $Na^+$ ions; however, for soft water to be usable in the preparation of good quality dispersions, it is preferred that the water contain less than about 500 ppm $Na^+$ ions.

Water useful in the methods of the present invention generally has a pH sufficient to render colloidal dispersions with a pH of about 1.5 to about 8.0. If the pH of the colloidal dispersion is less than about 1.5, the dispersion properties are usually detrimentally affected such that they produce inadequate antistatic coatings. If the pH of the colloidal dispersion is more than about 8.0, the dispersion properties are also detrimentally affected typically because of the dissolution of vanadium oxide to form vanadate compounds. Typically, deionized water with a pH within a range of about 5.0 to about 9.0 will produce a colloidal dispersion with a pH within a range of about 1.5 to about 8.0.

In a preferred preparation process for the antistatic coatings used in the present invention, a vanadium oxoalkoxide is preferably hydrolyzed by adding the vanadium oxoalkoxide to the water, as opposed to adding the water to the vanadium oxoalkoxide. This is advantageous because it typically results in the formation of a desirable colloidal dispersion and generally avoids excessive gelling. Whether the vanadium oxoalkoxide is added to the water or the water is added to the vanadium oxoalkoxide, the vanadium oxoalkoxide can be at least partially hydrolyzed before it is combined with the excess water. This can be done, for example, by spray drying the oxoalkoxide in the presence of water. The spray dried vanadium oxoalkoxide can then be combined with the excess water.

In these processes, the water initially reacts with the vanadium oxoalkoxides in a hydrolysis reaction. The hydrolyzed product then subsequently undergoes a condensation reaction to form a mixed valence vanadium oxide colloidal dispersion. That is, the vanadium oxide colloidal dispersions formed contain vanadium atoms in both the +4 and +5 formal oxidation states. Often the product is referred to as vanadium pentoxide ($V_2O_5$); however, its molecular formula can be more accurately represented by $V_2O_{4.67}$.

The homogeneous solution resulting from hydrolysis is preferably subjected to an aging process to allow for initially formed vanadium oxide fibrils to coalesce. Although this is preferred and advantageous for certain applications, the colloidal dispersions of the present invention do not need to be aged to be useful or to provide advantage over the vanadium oxide colloidal dispersions produced by known alkoxide hydrolysis methods. The aging process typically involves storing the solution in a constant temperature bath until a thixotropic colloidal dispersion is formed. Preferably, the aging is conducted for about 1–6 days in a 20°–90° C. water bath, more preferably a 40°–60° C. water bath. Improvement can be observed, however, with aging conditions of up to about 10 days. Most preferably, aging is conducted for a short period of time, such as for about 8–24 hours. Typically, an aged colloidal dispersion provides a more advantageous coating than one that has not been aged. For example, a coating made from an unaged colloidal dispersion can require a surface vanadium concentration 8 times greater than a material aged at 90° C. for 8 hours (to provide an electrostatic charge decay time of less than 0.10 seconds for decay of a 5000 V potential to less than 50 V). Thus, the aging process results in a colloidal dispersion capable of forming thinner coatings, i.e., coatings with less color.

As long as there is an excess of water used in the hydrolysis and subsequent condensation reactions of the vanadium oxoalkoxides, water-miscible organic solvents can also be present. That is, in certain preferred embodiments the vanadium oxoalkoxides can be added to a mixture of water and a water-miscible organic solvent. Miscible organic solvents include, but are not limited to, alcohols, low molecular weight ketones, dioxane, and solvents with a high dielectric constant, such as acetonitrile, dimethylformamide, dimethylsulfoxide, and the like. Preferably, the organic solvent is acetone or an alcohol, such as i-BuOH, i-PrOH, n-PrOH, n-BuOH, t-BuOH, and the like.

Preferably, the reaction mixture also contains an effective amount of hydroperoxide, such as, for example, $H_2O_2$ or t-butyl hydroperoxide. An "effective amount" of a hydroperoxide is an amount that positively or favorably affects the formation of a colloidal dispersion capable of producing an antistatic coating with a value of $[V]_{eff}$ of less than about 2.0 mg/m². The presence of the hydroperoxide enhances the reaction by facilitating production of an antistatic coating with highly desirable properties. Furthermore, the presence of the hydroperoxide appears to improve the dispersive characteristics of the colloidal dispersion. That is, when an effective amount of hydroperoxide is used the resultant colloidal dispersions are less cloudy, less turbid, and more well dispersed. The hydroperoxide is preferably present in an amount such that the amount of vanadium in the vanadium oxoalkoxide added to the hydroperoxide is within a range of about 1–4 moles of vanadium per mole of hydroperoxide originally present. While not wishing to be held to any particular theory, it is believed that the hydroperoxide accelerates the formation of acicular, i.e., needle-like, vanadium oxide colloidal particles.

The vanadium oxide antistatic layer may optionally contain an organic polymer. Preferred polymers are sulfonated organic polymers, i.e., those containing a salt of an —$SO_3H$ group, as disclosed in U.S. patent application Ser. No. 07/893,279 bearing Attorney's Docket No. 48349USA1A and entitled "Sulfopolymer/Vanadium Oxide Antistatic Compositions," which is incorporated herein by reference. The vanadium oxide/sulfopolymer composite layer preferably contains about 0.2–50 wt-% vanadium oxide and about 50–99.8 wt-% polymer.

Sulfonated polymers, such as sulfonated polyesters, are known to be useful primer layers. If used for this purpose, the priming function of the sulfonated polymer is not adversely affected by the inclusion of vanadium oxide in an amount sufficient to provide excellent antistatic properties. That is, an antistatic layer containing vanadium oxide and a sulfonated polymer can provide advantageous adherent properties to the substrate. Thus, such an antistatic layer can improve the adhesion of the colorant layer and/or the antistick layer to the base substrate of the donor sheet. Similarly, an antistatic layer with a sulfonated polymer can improve the adhesion of the image-receiving layer to the base substrate of the receptor sheet.

Preferred embodiments of this invention contain antistatic layers comprising vanadium oxide plus a polymer binder, such as a sulfonated polymer. However, it is important to note that vanadium oxide can be coated without a binder, which may be desirable if the polymer is one that interferes with thermal transfer properties. Such a vanadium oxide layer is preferably very thin, i.e., the vanadium oxide is applied in a low coating weight, to enhance the adhesion between the substrate and the layer overcoating the antistatic layer. Alternatively, use of an antistatic layer that shows a low level of adhesion to a substrate can be advantageously used as a delaminating liner as well as an antistatic layer.

Advantageously, the process of the present invention can be carried out in the presence of an organic polymer or prepolymer. In this way, colloidal dispersions of vanadium oxide can be prepared in situ in solutions or dispersions of organic polymers or prepolymers with which colloidally dispersed vanadium oxide is otherwise incompatible, as evidenced by flocculation of the colloidal dispersion. The organic polymers or prepolymers that are usable in this in situ manner are those that are soluble or dispersible in water or water plus a water-miscible solvent. Such organic polymers or prepolymers include, but are not limited to, polyacrylic acid; polyols such as those available from Dow Chemical under the trademark VORANOL™; polyvinyl alcohols; hydroxyethyl cellulose; polymethyl methacrylate; polyethyl acrylate; polystyrene; polystyrene/butadiene copolymers; polyvinylidene chloride; and the like. Preferably, the useful organic polymers or prepolymers are "soluble" in water or a mixture of water and a water-miscible organic solvent as described above. The ratio of the number of moles of vanadium oxoalkoxide initially added to the number of moles of an organic polymer or prepolymer can vary within a range of about 1:1 to about 1:499.

Generally, the hydrolysis and condensation reactions of the vanadium oxoalkoxides using an excess of water, can be carried out in air. Also, although it is preferred that the alkoxide be added to the water, the rate of addition is not typically crucial. It is desirable, however, that the mixture be stirred during the hydrolysis and condensation reactions. Furthermore, the initial hydrolysis can be carried out at any temperature in which the solvent (i.e., water or a mixture of water and a water-miscible organic solvent) is in a liquid form, e.g., within a range of about 0°–100° C. It is preferred, however, that the initial hydrolysis, and subsequent condensation, reactions be carried out within a temperature range of about 20°–30° C., i.e., at about room temperature.

The concentration of $V^{4+}$ in the resultant colloidal dispersions can be determined by titration with permanganate. Preferably, the mole fraction of $V^{4+}$ to $(V^{4+}+V^{5+})$, i.e., $V^{4+}$/total vanadium, is at least about 0.01:1.0, preferably at least about 0.05:1.0, and more preferably at least about 0.30:1.0. The concentration of $V^{4+}$ in the resultant colloidal dispersions can be easily varied, however, simply by removing volatile reaction products through distillation subsequent to hydrolysis of the vanadium oxoalkoxide. Significantly, the $V^{4+}$ concentrations can be varied over a range of about 1–40% of the total vanadium content. Although not intending to be limited by any theory, it is believed that the concentration of $V^{4+}$ may contribute to the intrinsic conductivity of the coatings. Furthermore, it is believed that the $V^{4+}$ ions contribute to the formation of the colloidal dispersions, perhaps acting as polymerization initiators or by controlling intercalation.

The vanadium oxide colloidal dispersions of the present invention can be diluted as desired with water or a water-miscible organic solvent prior to coating onto a substrate. The water-miscible organic solvent can be any of those listed above that can be present in the reaction mixture during the preparation of the colloidal dispersions. Preferably, the organic solvent with which the colloidal dispersion is diluted, prior to forming a film, is acetone or an alcohol.

Typically, the colloidal dispersions can be stored at any concentration. Preferably, they are stored at a concentration of about 0.3 wt-% to 2.0 wt-% vanadium. If necessary, the originally formed dispersions can be diluted to this concentration with water or a water-miscible organic solvent. No particular precautions need be observed during storage other than maintaining the temperature above the freezing point of the colloidal dispersions. If allowed to freeze, the colloidal dispersion is generally destroyed. The colloidal dispersions can be stored in any type of container, preferably glass or plastic. Furthermore, they can be stored in the presence or absence of light. Typically, as long as the colloidal dispersions are kept in a sealed container (to avoid evaporation of water), they are stable for at least about 6 months.

The vanadium oxide colloidal dispersions can be coated onto any flexible substrate used in the thermal transfer systems of the present invention, which are generally nonconductive substrates, or substrates that have less than a desirable conductivity. For example, the colloidal dispersions can be coated onto materials such as paper, cloth, flexible ceramic materials, and a variety of polymeric materials, including cellulose esters, polyesters, polycarbonates, polyolefins, copolymers, and terpolymers. The colloidal dispersions of the present invention can be coated directly onto any of these substrates or over an intermediate layer of a material that promotes or reduces adhesion, as needed for the desired properties, between the antistatic coating and the substrate.

The vanadium oxide colloidal dispersions, as well as the other coating materials used in thermal transfer systems, can be applied to a substrate by a variety of conventional solution coating methods. These include, but are not limited to, roll coating, brush coating, hopper coating, curtain coating, slide coating, knife coating, and rotogravure coating. Advantageously, the colloidal dispersions are coated using a slide coating, roll coating, or rotogravure coating process. These methods, and the techniques by which they are implemented, are all well known in the coating industry. The methods of manufacturing thermal transfer sheets can also include drying steps between coating the various layers for removing solvent, although this is not always required. Generally, if desirable, the drying steps are conducted at temperatures of no greater than about 100° C. These methods are well known in the thermal transfer imaging industry.

The amount of vanadium oxide colloidal dispersion used in the coating process can be widely varied. The upper limit of the amount used is generally controlled by the quality of the particular dispersion and the desire for a transparent and relatively colorless coating, i.e., one that is difficult to detect by the human eye. That is, although coatings can be prepared with coverages of 100 mg/m² and higher, for many uses it is preferable to have as thin a coating as possible, e.g., no more than about 3.0 mg/m², to decrease the color imparted to the coating, increase its transparency, improve uniformity, and in certain circumstances improve adhesion. Such thin coatings typically require a high quality colloidal dispersion, such as can be produced using the methods of the present invention, because the lower the quality of the colloidal dispersion, the more material needed to produce an acceptable antistatic coating. Because the vanadium oxide colloidal dispersions are colored, the more material used the more the coating is colored; however, if the colloidal dispersions are coated thinly enough on a substrate, they do not appear colored. Typically, an apparently "colorless" coating can be obtained with a coverage of no more than about 3.0 mg/m², preferably with no more than about 1.5 mg/m², and more preferably with no more than about 1.0 mg/m². By "colorless" it is meant that the coatings do not show significant absorption in the visible region of the spectrum (typically, they display an absorbance of less than 0.1)during a UV-VIS spectral analysis, and the coatings are substantially undetectable using a Macbeth Densitometer Model RD 514 (Nuburg, N.Y.).

The coatings prepared from the vanadium oxide colloidal dispersions preferred in the present invention typically contain whisker-shaped or needle-shaped particles. These particles have a high aspect ratio, i.e., the ratio of the length to the width of the particles, and are generally evenly distributed. By "high aspect ratio" it is generally meant that the ratio of the length to the width of the particles, as observed in the coatings produced from the colloidal dispersions invention by Field Emission Electron Microscopy, is greater than about 25.

The particles of vanadium oxide exist as a porous layer of particles (generally as fibers, fibrils or particles with one dimension significantly greater than the other dimensions) in intimate contact with each other. By intimate contact it is meant that particles physically contact other particles. The contact may be only at crossover or intersection points or may be more extensive. Across the length of the layer, a conductive path is created by the particle-to-particle contact. The particles may or may not be actually bound to particles at the point of contact. There may be only physical contact, electronic attraction, or some chemical bonding, as long as the conductive mechanism of the particles is maintained.

The vanadium oxide colloidal dispersions and antistatic coatings preferred in the present invention can contain a variety of additives as desired. They preferably contain wetting agents, i.e., surfactants, such as fluorinated surfactants and other commercially available surfactants, that promote coatability. They can contain polymeric binders that improve the mechanical properties of the antistatic coatings; metal dopants or modifiers such as $VO_2$, $Ag_2O$, $Cu_2O$, $MnO$, $ZnO$, $Nb_2O_5$, $MoO_3$, $WO_3$, $Sb_2O_3$, $GeO_2$, $Nd_{2O3}$, $Sm_2O_3$, $Gd_2O_3$, $Yb_2O_3$, and $Eu_2O_3$ that alter the dispersion properties, color, and/or electrical conductivity; dyes such as methylene blue, crystal violet, and acid violet; biocides; preservatives; antifreeze agents; and anti-foam agents. Metal dopants can be added as metal alkoxides, salts, or compounds during the hydrolysis of the vanadium oxide dispersions, or after the vanadium oxide dispersions are formed.

The invention has been described with reference to various specific and preferred embodiments and will be further described by reference to the following detailed examples. It is understood, however, that there are many extensions, variations, and modifications on the basic theme of the present invention beyond that shown in the examples and detailed description, which are within the spirit and scope of the present invention.

Experimental Examples.

Vanadium oxide colloidal dispersions were prepared as described below. Coating dispersions, i.e., vanadium oxide colloidal dispersions suitable for coating, were prepared with successively greater dilution (each successive coating dispersion was one half the concentration of the previous coating dispersion). Unless otherwise noted, coatings were prepared by hand spreading using a No. 3 Mayer bar onto poly(vinylidene chloride) (PVDC) primed polyester film (available from Specialty Film Division, 3M Company, St. Paul, Minn.). Each subsequent vanadium oxide coating had one half the surface vanadium concentration, i.e., coating weight, as the previous one. The effectiveness of the vanadium oxide colloidal dispersions for the preparation of antistatic coatings was determined as the surface concentration of vanadium ($[V]_{eff}$, in mg of vanadium per m² of substrate surface area) required to provide an electrostatic charge decay time of less than 0.10 second for decay of a 5000 V potential to less than 50 V. The surface concentration of vanadium reported in the following examples was calculated from formulation data assuming the density of each successively diluted vanadium oxide colloidal dispersion to be that of water (1.0 g/mL), and the wet coating thickness obtained with the No. 3 Mayer Bar to be 6.86 μm. An Inductively Coupled Plasma (ICP) Spectroscopic analysis of vanadium surface concentration of several coated film samples showed that the actual vanadium surface concentration was consistently about 40% of that calculated from the amount coated from a particular concentration of coating dispersion. Times required for decay of a 5000 V charge (to less than 50 V) were determined using a model 406C Static Decay Meter from Electro-Tech Systems, Inc., Glenside, Pa.

All reagents were obtained from Aldrich Chemical Co., Milwaukee, Wis., unless otherwise noted. The deionized water used in the examples below was prepared by pumping well water through a cation exchange bed (regenerated with sulfuric acid) and then through an anion exchange bed (regenerated with NaOH). The cation exchange resins used were sulfonated polystyrenes crosslinked with vinyl benzene, and the anion exchange resins used were quartenary ammonium styrenes crosslinked with vinyl benzene. These resins are commonly available under the trade designation AMBERLITE™ from Rohm & Haas, Philadelphia, Pa. In the process, cations were exchanged for $H^+$ ions and anions were exchanged for $OH^-$ ions. After passing through the exchange resins, the water was held in a tank prior to use.

EXAMPLE 1

A vanadium oxide colloidal dispersion was prepared by adding VO(O-i-Bu)₃ (15.8 g, 0.055 mol, product of Akzo Chemicals, Inc., Chicago, Ill.) to a rapidly stirring solution of $H_2O_2$ (1.56 g of 30% aqueous solution, 0.0138 mol, product of Mallinckrodt, Paris, Ky.) in deionized water (252.8 g), giving a solution with a vanadium concentration of 0.22 mole/kg (2.0% $V_2O_5$, 1.1% vanadium). Upon addition of VO(O-i-Bu)₃, the mixture became dark brown and gelled within five minutes. With continued stirring, the dark brown gel was broken up giving an inhomogeneous, viscous dark brown colloidal solution. This colloidal solution became homogeneous in about 45 minutes of continued stirring. The sample was allowed to stir for 1.5 hours at room temperature and was then transferred to a polyethylene bottle and aged in a constant temperature bath at 50° C. for 4 days to give a dark brown thixotropic gelatinous colloidal dispersion, i.e., a colloidal dispersion in which the dispersed phase has combined to produce a semi-solid material with a three-dimensional solid network containing a large volume of interconnecting pores filled with a liquid.

The surface concentration of vanadium required to provide static decay of 5000 V to less than 50 V in less than 0.10 second, $[V]_{eff}$, was determined for the vanadium oxide colloidal dispersion as follows. Portions of the vanadium oxide colloidal dispersion containing 1.1% vanadium, prepared as described above, were diluted with deionized $H_2O$ and TRITON™ X-100 surfactant to provide colloidal dispersions with 0.084, 0.042, 0.021, and 0.011% vanadium and 0.1% TRITON™ X-100. Each diluted dispersion was coated by hand using a No. 3 Mayer bar on PVDC primed polyester film to give vanadium oxide coatings with calculated surface vanadium concentrations of 5.76, 2.88, 1.44, and 0.72 mg/m², respectively. The static decay times for decay of a 5000 V potential to less than 50 V were measured for each of these coatings, and the value of $[V]_{eff}$ was determined to be 1.4 mg/m².

Calculation of coating weight:

Mol. Wt. of V=50.94 g/mole

Mol. Wt. of VO(O-i-Bu)₃=286.02 g/mole

Density of Vanadium Dispersion≈1 g/mL or 1 g/cm³

Coating Thickness=6.9×10⁻⁶ meters

In this example, 0.055 mole VO(O-i-Bu)₃ was used, which is equivalent to 0.055 mole V in 1.56 g $H_2O_2$+252.8 g $H_2O$=254.36 g total solvent mixture.

$$\frac{0.55 \text{ mole } V}{254.36 \text{ g solvent}} = \frac{0.22 \text{ mole } V}{kg} \text{ or } \frac{0.00022 \text{ mole } V}{cm^3 \text{ (or grams)}}$$

Coating area or volume = 6.9 × 10⁻⁶ m × 1 m × 1 m
= 6.9 × 10⁻⁶ m³ or 6.9 m³

Assuming the density of the dispersion is 1 g/cm³, then 6.9 grams is spread over 1 m³ of substrate.

$$6.9 \text{ g} \times \frac{0.00022 \text{ mole } V}{\text{g solvent}} \times \frac{50.94 \text{ g } V}{\text{mole } V} =$$

0.077 grams V over a 1 m² area

But, the dispersions are diluted, so for example if 1.1% sol is diluted with the addition of 547 mL of $H_2O$ to give a 0.17% sol, the calculated surface vanadium concentration is 11.5 mg/m².

EXAMPLE 2

This example demonstrates the preparation of a $V_2O_5$ dispersion according to U.S. Pat. No. 4,203,769. $V_2O_5$ (15.6 g, 0.086 mol, product of Aldrich, Milwaukee, Wis.) was heated in a covered platinum crucible for 10 minutes at 1100° C. and then poured into 487 g of rapidly stirring deionized $H_2O$. The resulting liquid plus gelatinous black precipitate was warmed to 40°–45° C. for 10 minutes and allowed to stir for 1 hour at room temperature to give a soft, thixotropic black gel which was diluted with 1,041.0 g deionized $H_2O$ to give a vanadium oxide colloidal dispersion containing 1.0% $V_2O_5$. The viscous colloidal dispersion was filtered to remove undispersed $V_2O_5$.

The surface concentration of vanadium required to provide static decay of 5000 V to less than 50 V in less than 0.1 second, $[V]_{eff}$, was determined as follows. Portions of the vanadium oxide colloidal dispersion, containing 0.56 wt-% vanadium (1.0% $V_2O_5$), were diluted with deionized water and Triton X-100 surfactant to provide colloidal dispersions with 0.17, 0.084, 0.042, and 0.21% vanadium and 0.1% Triton X-100. Each diluted dispersion was coated by hand spreading using a No. 3 Mayer bar onto PVDC primed PET film to produce vanadium oxide coatings with calculated surface vanadium concentrations of 11.6, 5.8, 2.9, and 1.4 mg/m², respectively. The static decay times for decay of a 5000 V potential to less than 50 V were determined for each of these coatings, and the value of $[V]_{eff}$ was determined to be 11.6 mg/m².

This example shows that solutions prepared according to U.S. Pat. No. 4,203,769 are less effective for the preparation of antistatic coatings than those prepared by the alkoxide process of the present invention. Furthermore, the former process is not particularly preferred because of the need for special containers, the generation of highly toxic $V_2O_5$ fumes by heating to high temperatures, and the difficulty in filtering out nondispersed $V_2O_5$.

EXAMPLE 3

This example demonstrates the preparation of a vanadium oxide colloidal dispersion by an ion exchange process. Sodium metavanadate (6.0 g, 0.049 mol, product of Alfa Products, Ward Hill, Mass.) was dissolved by warming in 144 g deionized $H_2O$. The resulting solution was filtered to remove insoluble material. The filtered solution was pumped through a 15 mm×600 mm chromatography column containing 600 mL of AMBERLITE™IR 120 Plus ($H^+$) (available from Aldrich Chemical, Milwaukee, Wis.) to give a light orange solution containing 1.7% vanadium. The solution became a soft opaque brick red gel upon standing at room temperature for 24 hours. After aging for 9 days at room temperature, the sample was diluted to give a hazy orange-red colloidal dispersion containing 0.17% vanadium. The value of $[V]_{eff}$ for the colloidal dispersion, determined as described in Example 1, was 23.0 mg/m².

This example shows that solutions prepared by an ion exchange process are less effective for the preparation of antistatic coatings than the colloidal dispersions of the alkoxide hydrolysis products.

EXAMPLE 4

This example demonstrates the preparation of a sulfopolyester. A one gallon polyester kettle was charged with 126 g (6.2 mol-%) dimethyl 5-sodiosulfoisophthalate, 625.5 g (56.8 mol-%) dimethyl terephthalate, 628.3 g (47.0 mol-%) dimethyl isophthalate, 854.4 g (200 mol-% glycol excess) ethylene glycol, 365.2 g (10 mol-%, 22 wt-% in final polyester) PCP-200™ polycaprolactone diol (Union Carbide), 0.7 g antimony oxide, and 2.5 g sodium acetate. The mixture was heated with stirring to 180° C. at 138 kPa (20 psi) under nitrogen, at which time 0.7 g zinc acetate was added. Methanol evolution was observed. The temperature was increased to 220° C. and held for 1 hour. The pressure was then reduced, vacuum applied (0.2 torr), and the temperature increased to 260° C. The viscosity of the material increased over a period of 30 minutes, after which time a high molecular weight, clear, viscous sulfopolyester was drained. This sulfopolyester was found by Differential Scanning Calorimetry to have a Tg of 41.9° C. The theoretical sulfonate equivalent weight was 3954 g polymer per mole of sulfonate. 500 g of the polymer were dissolved in a mixture of 2000 g water and 450 g isopropanol at 80° C. The temperature was then raised to 95° C. in order to remove the isopropanol and a portion of the water, yielding a 21% solids aqueous dispersion.

EXAMPLE 5

This example demonstrates the preparation of an antistatic thermal dye transfer donor film containing an antistatic layer comprising vanadium oxide prepared by the hydrolysis of VO(O-i-Bu)$_3$. A coating solution was prepared by adding, sequentially and with stirring, 6.2 g deionized water, 2.5 g diacetone alcohol, 10 g ethanol, and 2.0 g isobutanol to 1.5 g of 1% colloidal vanadium oxide prepared as described in Example 1. The coating solution contained 0.038 wt-% vanadium and was applied to unprimed and untreated 5.7 micron Teijin F22G polyester film (available from Teijin Ltd., Tokyo, Japan) using a No. 3 Mayer bar (product of RD Specialties, Webster, N.Y.) and dried for 5 minutes at 100° C. to give an antistatic substrate film with surface concentration of vanadium=2.6 mg/m$^2$. The static decay time of the substrate film was 0.01 second.

A dye solution containing 3.37 wt-% dibutyl magenta dye (4-tricyanovinyl-N,N-dibutylaniline), 0.84 wt-% butyl magenta (structure shown below), 3.94 wt-% GEON® 178 (polyvinyl chloride, B.F. Goodrich Co., Cleveland, Ohio), 0.28 wt-% VITEL™ PE-200 (polyester resin from Goodyear Chemicals Co., Akron, Ohio), 1.57 wt-% TROYSOL™ CD 1 dispersing agent (CAS registry No.: 64742-88-7, purchased from Troy Chemical, Newark, N.J.), 13.5 wt-% tetrahydrofuran, 36.0 wt-% methyl ethyl ketone, and 40.5 wt-% cyclohexanone was prepared. The individual components were first dissolved in an appropriate solvent and then mixed.

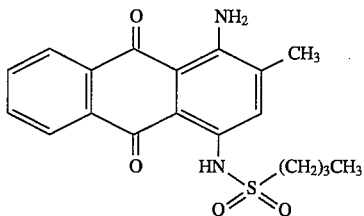

This dye solution was coated onto the antistatic layer using a No. 9 Mayer bar and dried at 85° C. for five minutes to give an antistatic thermal dye transfer donor film. The static decay time for the antistatic thermal dye transfer donor film was 0.04 second. In comparison, the dye solution was applied to unprimed and untreated 5.7 micron Teijin F22G polyester film using a No. 9 Mayer bar and dried at 85° C. for 5 minutes to give a non-antistatic thermal dye transfer film. The non-antistatic film did not exhibit decay of a triboelectrically generated charge and could not be charged by the Electro-tech Static Decay Meter.

The adhesion of the dye layer to the substrate, with and without an antistatic layer coated thereon, was determined by a cross-hatch adhesion test. This was performed according to International Test Standard ISO 2409, except that the samples were not held under controlled temperature and humidity conditions before testing. According to ISO 2409, lines were etched into a cross-hatched pattern of 100 squares, approximately 1 mm×1 mm. Delaminated and poorly adhered sections of the test coating were removed from squares of the cross-hatched pattern using SCOTCH® brand Magic Mending Tape #810 (3M Company, St. Paul, Minn.) by suddenly pulling off the tape at an angle of 90° to the applied layer. The percent adhesion is the number of squares remaining of the original 100. The adhesion of the dye layer to uncoated polyethylene teraphthlate (PET) film was 100%. The adhesion of the dye layer to coated PET film was 90%. This test was done on unprimed, untreated 4 mil (100 µm) PET film, not on Teijin film, to allow for cutting of the cross-hatched pattern.

This example shows that an antistatic layer of vanadium oxide prepared according to Example 1 can be inserted between a substrate and a donor colorant layer, providing excellent antistatic properties without substantially degrading adhesion of the dye layer to the substrate.

EXAMPLE 6

This example demonstrates the preparation of an antistatic thermal dye transfer donor film containing an antistatic layer comprising vanadium oxide prepared by the process of U.S. Pat. No. 4,203,769. A coating solution was prepared by adding 20.7 g deionized water and 0.3 g 10% TRITON™ X-100 surfactant (available from Aldrich Chemical Co., Milwaukee, Wis.) to 9.0 g of 1% colloidal vanadium oxide prepared as described in Example 2. The coating solution contained 0.17 wt-% vanadium and was applied to unprimed and untreated 5.7 micron Teijin F22G polyester film (available from Teijin Ltd., Tokyo, Japan) using a No. 3 Mayer bar and dried for 5 minutes at 100° C. to give an antistatic substrate with a surface concentration of vanadium=11.6 mg/m$^2$. The static decay time of the substrate film was 0.01 second.

A dye solution prepared as described in Example 5 was coated onto the antistatic layer using a No. 9 Mayer bar and dried at 85° C. for 5 minutes to give an antistatic thermal dye transfer donor film. The static decay time for the antistatic thermal dye transfer film was 0.02 second.

In a separate experiment, the dye solution was applied to a 4 mil (100 µm) PET film that had been previously coated with the antistatic layer of Example 2. The adhesion of the dye layer to the PET substrate was determined by the method outlined in Example 5. The adhesion of the dye layer to the antistatic PET film was 0%.

This example shows that an antistatic layer of vanadium oxide prepared according to Example 2 can be inserted between a substrate and a donor colorant layer giving excellent antistatic properties. For this particular combination of dye and vanadium oxide colloidal dispersion, however, the adhesion of the colorant layer was significantly reduced.

EXAMPLE 7

This example demonstrates the preparation of an antistatic thermal dye transfer donor film containing an antistatic layer comprising vanadium oxide prepared by an ion exchange process. A coating solution was prepared by adding 6.9 g deionized water and 0.1 g 10% TRITON™ X-100 surfactant to 3.0 g of 2% colloidal vanadium oxide prepared as described in Example 3. The 2% colloidal vanadium oxide had aged for 14 months at room temperature before using. The coating solution containing 0.34 weight percent (wt-%) vanadium was applied to unprimed and untreated 5.7 micron Teijin F22G polyester film (available from Teijin Ltd., Tokyo, Japan) using a No. 3Mayer bar and dried for 5 minutes at 100° C. to give an antistatic substrate film with calculated surface concentration of vanadium equal to 23.2 mg/m$^2$. The static decay time of the antistatic substrate film was 0.01 second.

A dye solution prepared as described in Example 5 was coated onto the antistatic layer using a No. 9 Mayer bar and dried at 85° C. for 5 minutes to give an antistatic thermal dye transfer donor film. The static decay time for the antistatic thermal dye transfer film was 0.02 second.

In a separate experiment, the dye solution was applied to a 4 mil (100 μm) PET film that had been previously coated with the antistatic layer of Example 3. The adhesion of the dye layer to the PET substrate was determined by the method outlined in Example 5. The adhesion of the dye layer to the antistatic PET film was 0%.

This example shows that an antistatic layer of vanadium oxide prepared according to Example 3 can be inserted between a substrate and a donor colorant layer giving excellent antistatic properties. For this particular combination of dye and vanadium oxide colloidal dispersion, however, the adhesion of the colorant layer was significantly reduced.

EXAMPLE 8

This example demonstrates the preparation of an antistatic thermal dye transfer donor film containing an antistatic primer layer comprising vanadium oxide prepared by hydrolysis of VO(O-iBu)$_3$ plus a sulfonated polyester. A coating solution was prepared by adding 15.9 g deionized water, 0.3 g 10% TRITON™ X-100 surfactant, and 2.5 g of the 21% sulfopolyester dispersion prepared according to Example 4 to 1.5 g of 1% colloidal vanadium oxide prepared as described in Example 1. The coating solution contained 0.041% vanadium and was applied to unprimed and untreated 5.7 micron Teijin F22G polyester film (available from Teijin Ltd., Tokyo, Japan) using a No. 6 Mayer bar and dried for 5 minutes at 100° C. to give an antistatic substrate film with a calculated surface concentration of vanadium equal to 5.6 mg/m$^2$. The static decay time of the antistatic substrate film was 0.03 second.

A dye solution prepared according to the method outlined in Example 5 was coated onto the antistatic layer using a No. 9 Mayer bar and dried at 85° C. for 5 minutes to give an antistatic thermal dye donor film. The static decay time for this antistatic thermal dye transfer film was 0.01 second.

The resulting dye donor sheet was used to transfer the dye to a 3M Desktop Color Proofing Base No. 77-9803-7693-1 (3M Co., St. Paul, Minn.) using a thermal printer. The printer used a Kyocera raised glaze thin film thermal print head (Kyocera Co., Kyoto, Japan) with 8 dots per mm and 0.3 watts per dot. In normal imaging; the electrical energy varies from 0 to 16 joules/cm$^2$, which corresponds to head voltages from 0 to 14 volts with a 23 msec burn time.

The donor and receptor sheets were assembled and imaged with the thermal print head at 14 volts. After imaging, the donor sheet was peeled apart from the receptor. No unwanted mass transfer or peeling of the dye layer from the polyester substrate was observed. A bright magenta color image was formed on the receptor with a high reflectance optical density of 2.56 as measured by a Gretag SPM 50 Spectrophotometer.

In a separate experiment, the dye solution of Example 5 was applied to a PET film that had been previously coated with the antistatic layer of this example. The adhesion of the dye layer to the PET substrate was determined by the method outlined in Example 5. The adhesion of the dye layer to the antistatic PET film was 100%.

This example shows that an antistatic layer of vanadium oxide prepared according to Example 1 plus sulfonated polymer can be inserted between a substrate film and a donor colorant layer and provide excellent antistatic properties and excellent adhesion of the dye layer.

EXAMPLE 9

This example demonstrates the preparation of a thermal dye transfer receptor film containing a vanadium oxide layer prepared according to Example 1. Deionized water (6.0 g), diacetone alcohol (2.8 g), ethanol (10.0 g), and isobutanol (2.0 g) were added sequentially with stirring to 1.5 g of vanadium oxide colloidal dispersion prepared as described in Example 1 containing 0.56 wt-% vanadium. This coating solution contained 0.038 wt-% vanadium. It was coated on a 6 micron corona-treated PET film using a No. 6 Mayer bar and dried at 100° C. for five minutes to give an antistatic substrate. The static decay time was 0.01 second.

The antistatic layer was overcoated with a thermal dye receiving layer (i.e., an image-receiving layer) consisting of 4.7 g/m$^2$ of UCAR® VYNS-3 (a vinyl chloride/vinyl acetate copolymer, 9:1 by weight, Mn=44,000, Union Carbide, Danbury, Conn.), 1.2 g/m$^2$ of MR-120 (a vinyl chloride copolymer, hydroxy equivalent weight 1,890 g/mol, sulfonate equivalent weight 19,200 g/mol, epoxy equivalent weight 2,400 g/mol, Tg=65° C., Mw=30,000 from Nippon Zeon Co., Tokyo, Japan), and 0.17 g/m$^2$ of KF-393 (amino-modified silicone from Shin-Etsu Silicone of America, Inc., Torrance, Calif.). The addition of the antistatic layer and dye receiving layer to the clear PET base did not significantly change its transparency. The difference in transmission optical density between the substrate itself and the coated film was only 0.01 as measured by a MacBeth TR927 densitometer.

The resulting receptor was imaged on a 3M RAINBOW™ Desktop Color Proofer using four color dye transfer ribbon and self-print pattern. A uniform full-color image was printed on the receptor, showing no peeling of the coating from the substrate. The reflectance optical densities of the resultant image, as measured by a Gretag SPM 50 Spectrophotometer were 0.78 for yellow, 1.21 for magenta, 1.28 for cyan, and 2.04 for black. The static decay time of the imaged receptor was 0.01 second.

In a comparative experiment, the same image-receiving layer was applied to the same PET base but without the antistatic coating to form a non-antistatic dye receptor sheet. The resultant receptor sheet did not exhibit decay of a triboelectrically generated charge and could not be charged by the Electro-tech Static Decay Meter.

This example demonstrates that an antistatic layer of vanadium oxide prepared according to Example 1 can be inserted between a substrate and thermal dye image-receiving layer and provide excellent antistatic properties. This can be accomplished without unacceptably lowering the adhesion of the image-receiving layer to the substrate and without imparting an unacceptable coloration to the film.

EXAMPLE 10

This example demonstrates the preparation of an antistatic thermal dye receptor film containing an antistatic primer layer comprising vanadium oxide prepared by hydrolysis of VO(O-i-Bu)$_3$ plus a sulfonated polyester. A coating solution was prepared by adding 15.9 g deionized water, 0.3 g 10% TRITON™ X-100 surfactant, and 2.5 g of the 21% sulfopolyester dispersion prepared according to Example 4 to 1.5 g of 1% colloidal vanadium oxide prepared as described in Example 1. The coating solution contained 0.041% vanadium and was applied to unprimed and untreated 4 mil (100 μm) PET film using a No. 6 Mayer bar and dried for 5 minutes at 100° C. to give an antistatic substrate film with a calculated surface concentration of vanadium equal to 5.6 mg/m$^2$. The static decay time of the antistatic substrate film was 0.01 second.

The antistatic layer was overcoated with the same image-receiving layer and imaged on the same printer under the same conditions as described in Example 9. The addition of the antistatic layer to the clear PET base resulted in slight coloration, increasing the transmission optical density of the film by 0.01 as measured by the same MacBeth densitometer. The resulting image was very uniform with reflectance optical density of 0.82 for yellow, 1.08 for magenta, and 1.15 for cyan. The adhesion of these coatings to the substrate was excellent. They could not be peeled off by a SCOTCH™ transparent pressure sensitive adhesive tape (3M Co., St. Paul, Minn.).

This example shows that an antistatic layer containing vanadium oxide prepared according to Example 1 plus a sulfopolymer can be inserted between a substrate film and a thermal image-receiving layer, and provide excellent antistatic properties to the film. This can be accomplished while providing excellent adhesion of the image-receiving layer to the substrate and without imparting an unacceptable coloration to the film.

EXAMPLE 11

This example demonstrates the preparation of an antistatic thermal dye receptor film containing an antistatic primer layer comprising vanadium oxide prepared by the process of U.S. Pat. No. 4,203,769 plus a sulfonated polyester. A coating solution was prepared by adding 15.9 g deionized water, 0.3 g 10% TRITON™ X-100 surfactant, and 2.5 g of the 21% sulfopolyester dispersion prepared according to Example 4 to 1.5 g of 1% colloidal vanadium oxide prepared as described in Example 2. The coating solution contained 0.041% vanadium and was applied to unprimed and untreated 6 micron PET film using a No. 12 Mayer bar to give an antistatic layer with surface concentration of vanadium equal to 11.2 mg/m$^2$ and dried for 5 minutes at 100° C. to give an antistatic substrate film. The static decay time of the antistatic substrate film was 0.01 second.

The antistatic layer was overcoated with the same image-receiving layer, imaged on the same printer, and tested under the same conditions as described in Example 9. The addition of the antistatic layer to the clear PET base resulted in slight coloration, increasing the transmission optical density of the film by 0.02 as measured by the same MacBeth densitometer. The resulting image was very uniform with reflectance optical density of 0.93 for yellow, 1.40 for magenta, and 1.75 for cyan. The adhesion of these coatings to the substrate was adequate but could be forcefully peeled off by a SCOTCH™ transparent pressure sensitive adhesive tape (3M Co., St. Paul, Minn.).

This example shows that an antistatic layer containing vanadium oxide prepared according to Example 2 plus a sulfopolymer can be inserted between a substrate film and a thermal image-receiving layer and provide excellent antistatic properties. This can be accomplished while providing adequate adhesion of the image-receiving layer to the substrate and with only slight coloration to the film.

EXAMPLE 12

This example demonstrates the preparation of an antistatic thermal dye receptor film containing an antistatic primer layer comprising vanadium oxide prepared by an ion exchange process plus a sulfonated polyester. A coating solution was prepared by adding 11.8 g deionized water, 0.2 g 10% TRITON™ X-100 surfactant, and 6.26 g of the 21% sulfopolyester dispersion prepared according to Example 4 to 1.88 g of 2% colloidal vanadium oxide prepared as described in Example 3. The coating solution contained 0.11% vanadium and was applied to unprimed and untreated 6 micron PET film using a No. 12 Mayer bar to give an antistatic layer with surface concentration of vanadium equal to 28.9 mg/m$^2$. This layer was dried for 5 minutes at 100° C. to give an antistatic substrate film. The static decay time of the antistatic substrate film was 0.05 second.

The antistatic layer was overcoated with the same image-receiving layer, imaged on the same printer, and tested under the same conditions as described in Example 9. The addition of the antistatic layer to the clear PTE base resulted in slight coloration, increasing the transmission optical density of the film by 0.12 as measured by the same MacBeth densitometer. The resulting image was very uniform with reflectance optical density of 0.90 for yellow, 1.35 for magenta, and 1.39 for cyan. The adhesion of these coatings to the substrate was adequate but could be forcefully peeled off by a SCOTCH™ transparent pressure sensitive adhesive tape (3M Co., St. Paul, Minn.).

This example shows that an antistatic layer containing vanadium oxide prepared according to Example 3 plus a sulfopolymer can be inserted between a substrate film and a thermal dye image-receiving layer with excellent antistatic properties. This can be accomplished with adequate adhesion of the image-receiving layer to the substrate but with some undesirable coloration to the film.

Comparative Example I

This example describes the preparation of a thermal dye transfer donor film containing an antistatic layer comprising antimony doped tin oxide and a sulfonated polyester binder. A conductive antimony doped tin oxide powder containing 91 wt-% SnO$_2$ (72 wt-% tin) and 9 wt-% Sb$_2$O$_3$, available commercially from C. Withington Co., Pelham Manor, N.Y., as T-1 Electro Conductive Powder (product of Mitsubishi Metal Corporation) was dispersed into a solution of sulfonated polyester, prepared as described in Example 4, in deionized water using a high speed OMNI™ 5100 Homogenizer (available from PGC Scientific, Gaithersburg Md.) by blending at 30,000 rpm for 5 minutes. The dispersion contained 0.38 g tin oxide powder, 0.20 g 10% TRITON™ X-100, 1.82 g 21% sulfopolyester, and 17.6 g deionized water. This dispersion was coated onto 6 micron PET film using a No. 12 Mayer bar and dried for five minutes at 100° C. to give an antistatic film sample with surface concentration of tin equal to about 370 mg/m$^2$. The static decay time for the sample was 0.01 sec. The dispersion was diluted with an equal portion of deionized water and again coated using a No. 12 Mayer bar. The sample prepared from the diluted solution did not exhibit dissipation of triboelectrically generated static charges and could not be charged using the Electro-tech Static Decay Meter.

A thermal dye transfer donor film was provided by coating the dye solution prepared as described in Example 5 onto the film sample provided with the antistatic coating containing 370 mg/m$^2$ of tin using a No. 9 Mayer bar and drying at 85° C. for five minutes. The thermal dye transfer film sample did not exhibit dissipation of triboelectrically generated static charges and could not be charged by the Electro-tech Charge Decay Meter.

This comparative experiment shows that an electroconductive powder containing tin oxide plus antimony oxide can be used to prepare an antistatic film. However, the surface concentration of electroconductive powder required for effective charge dissipation is much higher than that of vanadium oxide. Furthermore, when the antistatic layer is overcoated by the dye solution, the film becomes non-antistatic.

Comparative Example II

This example describes the preparation of a thermal dye transfer donor film containing an antistatic layer comprising ZELEC™ Electroconductive Powder 2703-S (a product of DuPont Corporation, Wilmington Del.) and a sulfonated polyester binder. ZELEC™ ECP-2703-S, an electroconductive powder containing tin oxide, antimony oxide, and silica (43 wt-% tin) was dispersed into a solution of sulfonated polyester (prepared according to the method of Example 4) in deionized water using a high speed OMNI™ 5100 Homogenizer (available from PGC Scientific, Gaithersburg, Md.) by blending at 30,000 rpm for five minutes. The dispersion contained 1.24 g ZELEC™ 2703-S, 5.9 g 21% sulfopolyester, 0.20 g 10% TRITON™ X-100, and 12.66 g deionized water. This dispersion was coated onto 6 micron PET film using a No. 12 Mayer bar and dried for five minutes at 100° C. to give an antistatic film sample with a surface concentration of tin of about 740 mg/m$^2$. The static decay time for the sample was 0.01 sec. The dispersion was diluted with an equal portion of deionized water and again coated using a No. 12 Mayer bar. The sample prepared from the diluted solution did not exhibit dissipation of triboelectrically generated static charges and could not be charged using the Electro-tech Static Decay Meter.

A thermal dye transfer donor film was provided by coating the dye solution prepared as described in Example 5 onto the film sample provided with the antistatic coating containing 740 mg/m$^2$ of tin using a No. 9 Mayer bar and drying at 85° C. for five minutes. The thermal dye transfer donor film sample exhibited a static decay time of 0.01 sec. The dye transfer film surface had a matte appearance.

In a separate experiment, the dye solution was applied to 4 mil (100 μm) PET film, which had been previously coated with the antistatic layer as described above. The adhesion of the dye layer to the substrate was determined by the method of International Test Standard ISO 2409 as described in Example 5 and found to be 100%. When tested by the method described in Example 9, the donor sheet resulted in unwanted mass transfer problems and low image density.

This comparative experiment shows that an antistatic layer containing ZELEC™ 2703-S electroconductive powder plus a sulfonated polymer can be inserted between a substrate and a thermal colorant layer. This provides excellent antistatic properties and excellent adhesion of the colorant layer. However, the amount of electroconductive powder is much higher than the amount of vanadium oxide required to provide excellent static dissipation. Furthermore, the donor sheet containing ZELEC™ 7703-S exhibited unwanted mass transfer problems and low image density.

The disclosures of all patents, patent applications, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A thermal transfer system comprising a thermal dye transfer donor sheet and a thermal dye transfer receptor sheet wherein the receptor sheet comprises a flexible substrate having a front side and a back side, an image-receiving layer coated on the front side of the substrate, and wherein the vanadium oxide antistatic layer is coated on the front side of the receptor sheet flexible substrate and is positioned between the flexible substrate and the image-receiving layer.

2. A thermal transfer system comprising a thermal dye transfer donor sheet and a thermal dye transfer receptor sheet wherein the receptor sheet comprises a flexible substrate having a front side and a back side, an image-receiving layer coated on the from side of the substrate, and wherein the donor sheet comprises a flexible substrate having a front side and a back side, a colorant layer coated on the front side, and a vanadium oxide antistatic layer positioned between the flexible substrate and the colorant layer.

3. The thermal transfer system of claim 2 further comprising an antistick layer coated on the backside of the flexible substrate.

4. A process for providing an image by a thermal transfer process comprising the steps of:
   (a) providing a thermal transfer donor sheet and a thermal transfer receptor sheet in a facing relationship; and
   (b) applying heat in an imagewise distributed manner to the donor sheet to cause material on the donor sheet to transfer to the receptor sheet;
   wherein the receptor sheet comprises a flexible substrate having a front side and a back side, an image-receiving layer coated on the front side of the substrate, and a vanadium oxide antistatic layer coated on the flexible substrate, and wherein the antistatic layer is coated on the front side of the flexible substrate and is positioned between the flexible substrate and the image-receiving layer.

5. The process of claim 4 wherein the thermal transfer process is a thermal dye transfer process and the material transferred from the donor sheet to the receptor sheet is a colorant.

6. The process of claim 4 wherein the thermal transfer process is a thermal mass transfer process and the material transferred from the donor sheet to the receptor sheet includes a colorant and a binder.

7. A process for providing an image by a thermal transfer process comprising the steps of:
   (a) providing a thermal transfer donor sheet and a thermal transfer receptor sheet in a facing relationship; and
   (b) applying heat in an imagewise distributed manner to the donor sheet to cause material on the donor sheet to transfer to the receptor sheet;
   wherein the donor sheet comprises a flexible substrate having a front side and a back side, a colorant layer coated on the front side of the substrate, and a vanadium oxide antistatic layer coated on the flexible substrate, wherein the antistatic layer is coated on the front side of the flexible substrate and is positioned between the flexible substrate and the colorant layer.

8. A thermal transfer system comprising a thermal transfer donor sheet and a thermal transfer receptor sheet in which system the donor sheet comprises a flexible substrate having a frontside and a backside, a colorant layer coated on the frontside, and a vanadium oxide antistatic layer positioned between the flexible substrate and the colorant layer.

9. A thermal transfer system comprising a thermal transfer donor sheet and a thermal transfer receptor sheet in which system the thermal transfer donor sheer comprises a flexible substrate having a front side and a back side, a colorant layer coated on the front side, and a vanadium oxide antistatic layer coated on the back side, the thermal transfer donor sheet further comprising an antistick layer coated on the back side of the flexible substrate and the vanadium oxide antistatic coating is between the flexible substrate and the antistick layer.

10. The thermal transfer system of claim 9 in which the vanadium oxide antistatic layer comprises an antistick material and vanadium oxide in an amount effective for electrostatic dissipation.

11. A thermal transfer system comprising a thermal transfer donor sheet and a thermal transfer receptor sheet in which system the thermal transfer receptor sheet comprises a flexible substrate having a frontside and a backside, an image-receiving layer coated on the frontside of the substrate, and a vanadium oxide antistatic layer coated on the flexible substrate, said vanadium oxide antistatic layer being positioned between the flexible substrate and the image receiving layer.

12. A thermal transfer system comprising a thermal transfer donor sheet and a thermal transfer receptor sheet wherein at least one of the donor sheet or the receptor sheet includes a vanadium oxide antistatic layer coated thereon and in which system the vanadium oxide antistatic layer comprises vanadium oxide particles which have a high aspect ratio.

13. A thermal transfer system comprising a thermal transfer donor sheet and a thermal transfer receptor sheet wherein at least one of the donor sheet or the receptor sheet includes a vanadium oxide antistatic layer coated thereon and in which system the vanadium oxide antistatic layer comprises vanadium oxide particles which are fibers.

14. A thermal transfer system comprising a thermal transfer donor sheet and a thermal transfer receptor sheet wherein at least one of the donor sheet or the receptor sheet includes a vanadium oxide antistatic layer coated thereon and in which system the vanadium oxide antistatic layer is formed from a colloidal dispersion which has a ratio of $V^{4+}$ to total vanadium content of at least 0.01:1.

15. A thermal transfer system comprising a thermal mass transfer donor sheet and a thermal mass transfer receptor sheet wherein the receptor sheet includes a vanadium oxide antistatic layer coated thereon, the receptor sheet comprising a flexible substrate having a front side and a back side, an image-receiving layer coated on the front side of the substrate, and wherein the vanadium oxide antistatic layer is coated on the front side of the receptor sheet flexible substrate and is positioned between the flexible substrate and the image-receiving layer.

16. A thermal transfer system comprising a thermal mass transfer donor sheet and a thermal mass transfer receptor sheet wherein of the donor sheet includes a vanadium oxide antistatic layer coated thereon, the receptor sheet comprising a flexible substrate having a front side and a back side, an image-receiving layer coated on the front side of the substrate, and wherein the donor sheet comprises a flexible substrate having a front side and a back side, a colorant layer coated on the front side, and a vanadium oxide antistatic layer positioned between flexible substrate and the colorant layer.

* * * * *

UNITED STATES PATENT AND TRADEMARK OFFICE
CERTIFICATE OF CORRECTION

PATENT NO.: 5,587,351
DATED: December 24, 1996
INVENTOR(S): Morrison et al.

It is certified that error appears in the above-identified patent and that said Letters Patent is hereby corrected as shown below:

Col. 24, line 63, "No. 3Mayer" should be --No. 3 Mayer--.

Col. 30, line 13, "from" should be --front--.

Col. 32, line 22, "wherein of the" should be --wherein the--.

Signed and Sealed this

Second Day of September, 1997

Attest:

BRUCE LEHMAN

Attesting Officer

Commissioner of Patents and Trademarks